(12) United States Patent
Yamada et al.

(10) Patent No.: US 8,893,686 B2
(45) Date of Patent: Nov. 25, 2014

(54) SUCTION FILTER

(75) Inventors: Katsuhisa Yamada, Okazaki (JP);
Tetsuro Okazono, Okazaki (JP);
Hironobu Oki, Oyama (JP); Akihiro Ishitoya, Saitama (JP); Tomohito Ishihara, Nagoya (JP)

(73) Assignees: Denso Corporation, Kariya (JP);
Kyosan Denki Co., Ltd., Koga (JP)

( * ) Notice: Subject to any disclaimer, the term of this patent is extended or adjusted under 35 U.S.C. 154(b) by 316 days.

(21) Appl. No.: 13/425,445

(22) Filed: Mar. 21, 2012

(65) Prior Publication Data

US 2012/0240901 A1     Sep. 27, 2012

(30) Foreign Application Priority Data

Mar. 23, 2011   (JP) .................................. 2011-64729

(51) Int. Cl.
| | |
|---|---|
| *F02M 37/08* | (2006.01) |
| *F02M 37/22* | (2006.01) |
| *B01D 35/027* | (2006.01) |
| *B01D 35/26* | (2006.01) |
| *F02M 37/10* | (2006.01) |
| *F02M 41/04* | (2006.01) |

(52) U.S. Cl.
CPC .............. *B01D 35/027* (2013.01); *F02M 37/22* (2013.01); *B01D 35/26* (2013.01); *B01D 2201/127* (2013.01); *F02M 37/103* (2013.01); *F02M 37/106* (2013.01)
USPC .......................................... 123/509; 123/497

(58) Field of Classification Search
USPC .......... 123/509, 497, 514; 417/410.1; 55/290, 55/385.3; 239/575
See application file for complete search history.

(56) References Cited

U.S. PATENT DOCUMENTS

| | | | |
|---|---|---|---|
| 7,069,914 B2* | 7/2006 | Nagata ........................... | 123/509 |
| 7,628,143 B2* | 12/2009 | Yamada et al. ................ | 123/509 |
| 2002/0073972 A1 | 6/2002 | Orsini et al. | |
| 2003/0071146 A1* | 4/2003 | Yamada ......................... | 239/575 |
| 2009/0007527 A1* | 1/2009 | Mitsudou ........................ | 55/290 |

FOREIGN PATENT DOCUMENTS

| | | |
|---|---|---|
| JP | 2002-28418 | 1/2002 |
| JP | 2007-064002 | 3/2007 |
| JP | 2007-154682 | 6/2007 |

OTHER PUBLICATIONS

Office Action (2 pages) dated Apr. 15, 2014 issued in corresponding Japanese Application No. 2011-064729 and English translation (3 pages).

* cited by examiner

*Primary Examiner* — Mahmoud Gimie
(74) *Attorney, Agent, or Firm* — Nixon & Vanderhye P.C.

(57) ABSTRACT

A pump unit having a fuel pump and a suction filter is provided in a sub tank of a fuel tank. A filter element sheet for the suction filter is formed in a cup shape, a bottom wall portion of which faces to an inner bottom surface of the sub tank. A suction port of the fuel pump is opened to a fuel passage formed in the inside of the suction filter, so that filtered fuel is sucked into the fuel pump. Multiple mountain fold portions and multiple valley fold portions are formed on a side wall of the cup-shaped filter element sheet, to thereby increase surface area for filtering the fuel.

10 Claims, 17 Drawing Sheets

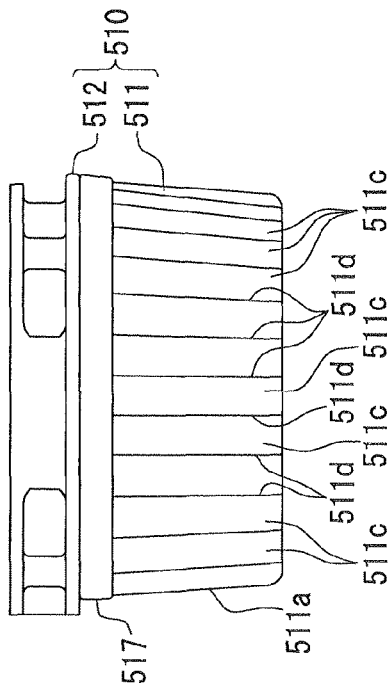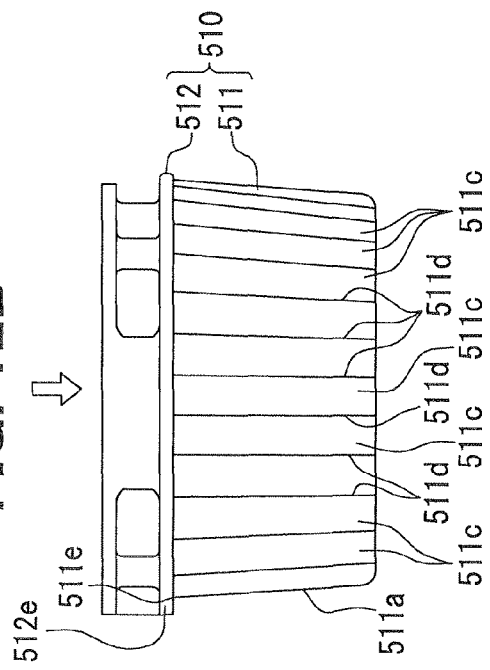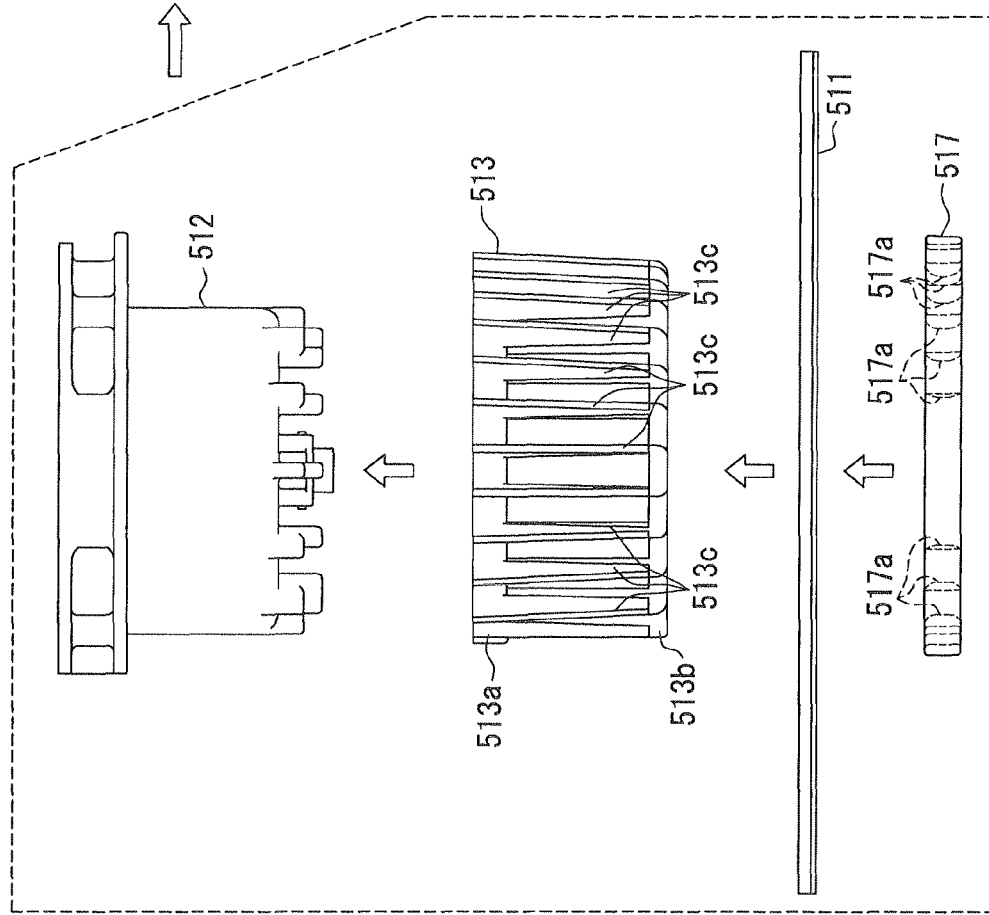
FIG. 12A
FIG. 12B
FIG. 12C

US 8,893,686 B2

SUCTION FILTER

CROSS REFERENCE TO RELATED APPLICATION

This application is based on Japanese Patent Application No. 2011-064729 filed on Mar. 23, 2011, the disclosure of which is incorporated herein by reference.

TECHNICAL FIELD

The present disclosure relates to a suction filter for a fuel supply apparatus for supplying fuel from a fuel tank to an outside of the fuel tank (for example, to an internal combustion engine).

BACKGROUND

A suction filter for a fuel supply apparatus is known in the art for filtering fuel, which is sucked into a suction port of a fuel pump provided in a fuel tank. It is required for the suction filter to increase a surface area of a filter element. In a case that the surface area for the filter element is not sufficiently assured, life duration of the filter element is remarkably decreased due to clogging. In addition, a pressure loss for fuel suction is increased due to the clogging, to thereby generate vapors. As a result, a pump performance is likely to decrease.

For example, as disclosed in Japanese Patent Publication No. 2002-028418, a filter element is formed in a cylindrical shape having a bottom portion so as to increase a surface area thereof. According to such a prior art, the bottom portion of the filter element faces to an inner bottom surface of a fuel tank, so that fuel in the fuel tank is sucked into a fuel pump through such bottom portion of the filter element. According to such a structure, a fuel suction performance (a fuel cut-off performance) can be improved.

According to the suction filter of the above prior art, however, the filter element is formed in the cylindrical shape with the bottom portion in such a manner that a core member (which is connected to a suction port of the fuel pump) is immersed into water solution of textile material. A longer time is necessary to manufacture such filter element. It is, therefore, a disadvantage that productivity may be decreased.

SUMMARY OF THE DISCLOSURE

The present disclosure is made in view of the above points. It is an object of the present disclosure to provide a suction filter, which can be manufacture at a high productivity.

According to a feature of the present disclosure, for example, as defined in the appended claim 1, a suction filter for a fuel supply apparatus, which is provided in a fuel tank for supplying fuel from the fuel tank to an outside of the fuel tank, filters out extraneous material from the fuel to be sucked into a suction port of a fuel pump from the fuel tank. The above suction filter comprises:

a core member for forming a fuel passage connected to the suction port so that the fuel is supplied from the fuel passage into the suction port; and a filter element sheet for covering the core member and formed in a cup shape, a bottom wall portion of which faces to an inner bottom surface of the fuel tank, wherein the filter element sheet filters out the extraneous material from the fuel flowing from the fuel tank into the fuel passage.

According to the above feature, the filter element sheet is formed in the cup shape having a large surface area, so that life duration and pump performance can be improved. In addition, since the bottom wall portion of the cup-shaped filter element sheet is so arranged as to face to the inner bottom surface of the fuel tank, the pump performance (a fuel-cut performance) is also improved. A configuration of the cup-shaped filter element sheet can be realized when the core member is covered with the filter element sheet and the sheet is bent and/or folded by a ring jig or a ring member, which is inserted onto (or fit in to) the core member. Therefore, a manufacturing time can be decreased to realize a high productivity.

BRIEF DESCRIPTION OF THE DRAWINGS

The above and other objects, features and advantages of the present disclosure will become more apparent from the following detailed description made with reference to the accompanying drawings. In the drawings:

FIGS. 12A to 12C are schematic views for explaining a manufacturing process for the suction filter of the fuel supply apparatus according to the first embodiment of the present disclosure;

DETAILED DESCRIPTION OF THE PREFERRED EMBODIMENTS

Figure 1:
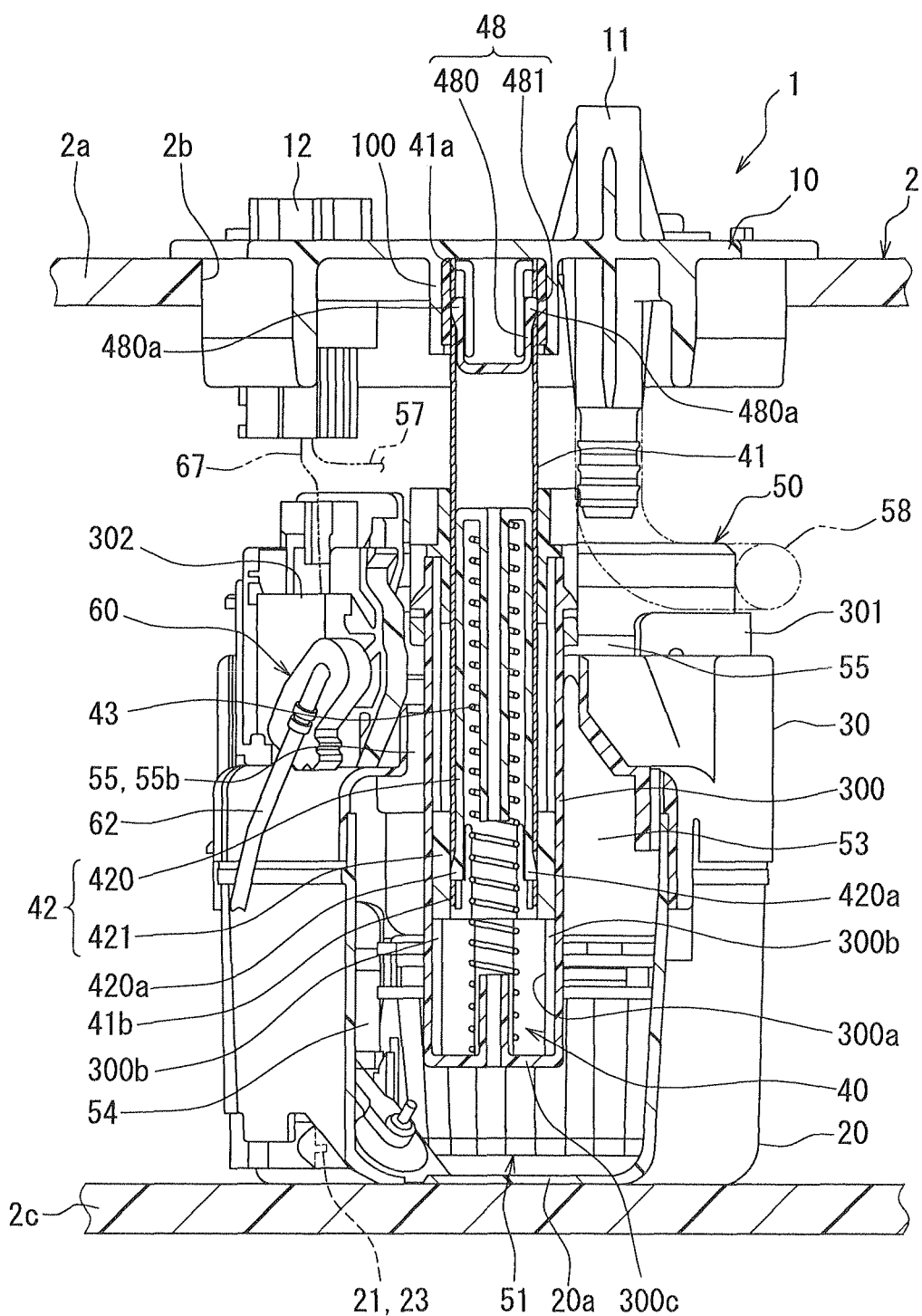
FIG. 1 is a schematic cross sectional view, taken along a line I-I in FIG. 3, showing a fuel supply apparatus according to a first embodiment of the present disclosure.

The present disclosure will be explained by way of multiple embodiments with reference to the drawings. The same reference numerals are used throughout the embodiments for the purpose of designating the same or similar parts and/or components.

First Embodiment

Figure 2:
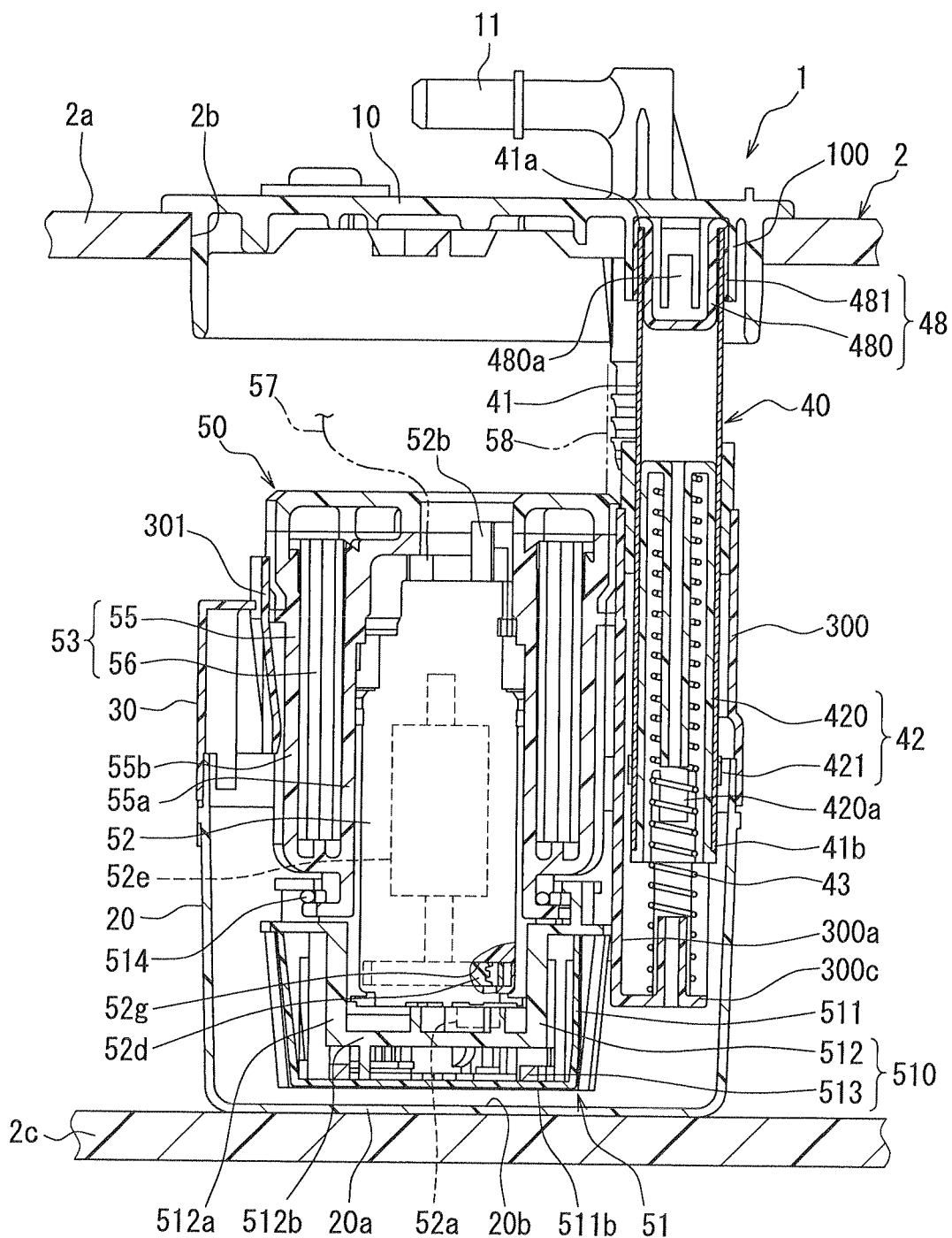
FIG. 2 is a schematic cross sectional view, taken along a line II-II in FIG. 3, showing the fuel supply apparatus according to the first embodiment of the present disclosure.

FIGS. 1 and 2 show a fuel supply apparatus 1 according to a first embodiment of the disclosure. The fuel supply apparatus 1 is mounted in a fuel tank 2 of a vehicle so as to supply fuel from the fuel tank 2 to an outside thereof (for example, to an internal combustion engine of the vehicle). In FIGS. 1 and 2, which show a condition of the fuel supply apparatus 1 mounted in the fuel tank 2, an up-and-down direction in the drawings corresponds to a vertical direction of the vehicle.

A basic structure of the fuel supply apparatus 1 will be explained. The fuel supply apparatus 1 is composed of a flanged portion 10, a sub tank 20, a cap member 30, an adjusting mechanism 40, a pump unit 50, and a fuel level sensor 60. The above parts and/or components, except for the flanged portion 10, are arranged at respective predetermined positions in the fuel tank 2.

Figure 3:
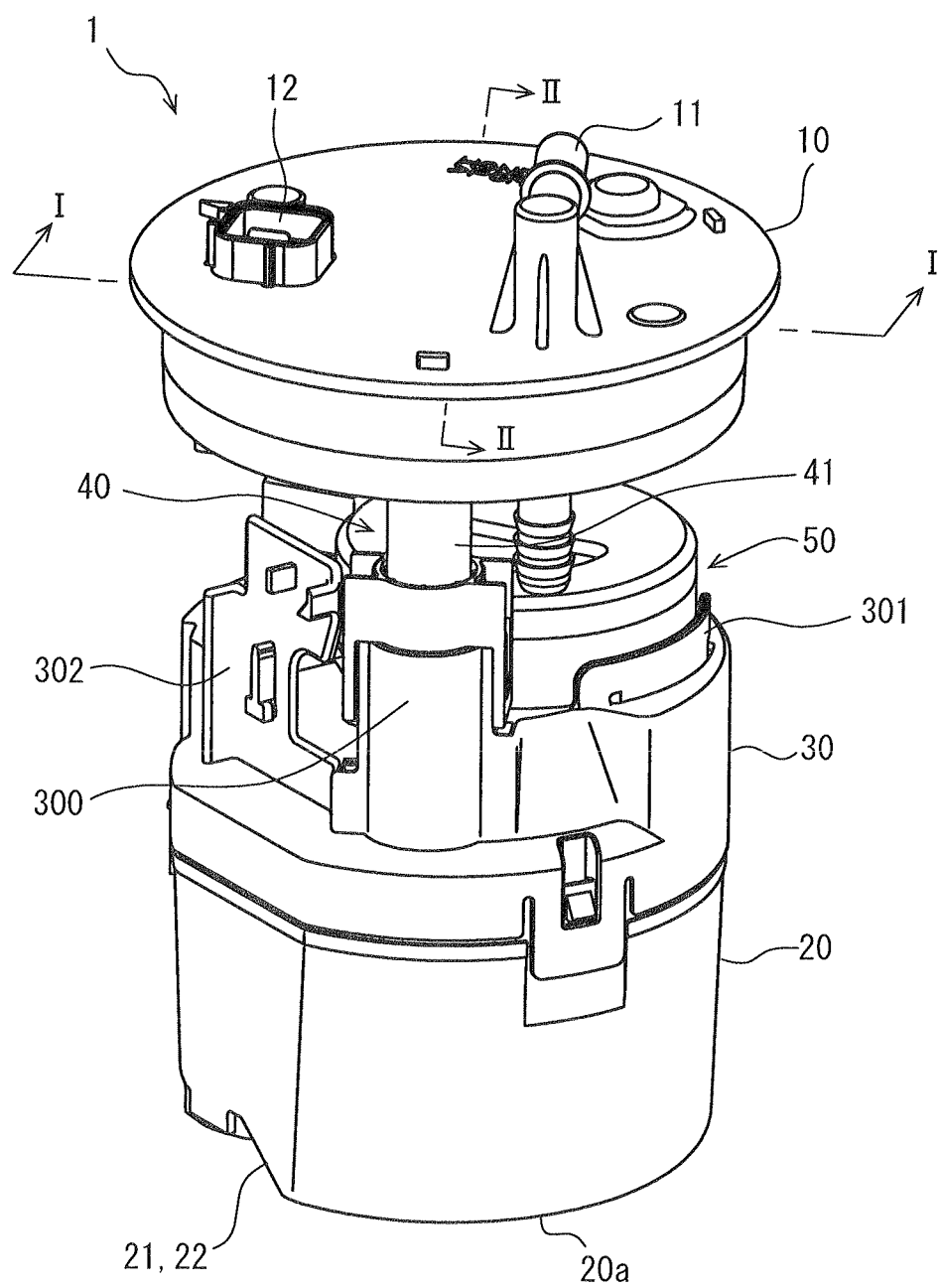
FIG. 3 is a schematic perspective view showing the fuel supply apparatus according to the first embodiment of the present disclosure.

The flanged portion 10 is made of resin and formed in a disc shape. The flanged portion 10 is attached to a through-hole 2b formed in a ceiling portion 2a of the fuel tank 2 so as to close the through-hole 2b. The flanged portion 10 has a fixed cylindrical portion 100 extending in a downward direction. As shown in FIGS. 1 to 3, the flanged portion 10 further has a fuel supply pipe 11 and an electrical connector 12. The fuel supply pipe 11 supplies fuel pumped out from the pump unit 50 to the outside of the fuel tank 2 (e.g. to the engine of the vehicle).

The electrical connector 12 includes terminals (not shown) for electrically connecting the pump unit 50 as well as the fuel level sensor 60 to the outside of the fuel tank 2 (for example, an electronic control unit and/or a battery of the vehicle). According to such a structure, an electric pump 52 of the pump unit 50 is operated by power supply from the outside via the electrical connector 12, while a detection signal for remaining amount of the fuel in the fuel tank 2 is outputted to the outside (e.g. the electronic control unit) via the electrical connector 12.

The sub tank 20 is made of resin and is formed in a cylindrical shape having a bottom. The sub tank 20 is accommodated in the fuel tank 2 and attached on a bottom wall 2c of the fuel tank 2. A jet pump 21 is provided in a bottom portion 20a of the sub tank 20. The jet pump 21 has a fuel inlet passage 22 and a jet nozzle 23. The fuel inlet passage 22 communicates the inside of the fuel tank 2 with the inside of the sub tank 20. The jet nozzle 23 injects surplus fuel toward the fuel inlet passage 22, wherein the surplus fuel is discharged from a pressure regulator 54 of the pump unit 50. Negative pressure (lower than the atmospheric pressure) is generated in the fuel inlet passage 22 by such fuel injection, so that the fuel in the fuel tank 2 is sucked into the fuel inlet passage 22 to thereby transfer the fuel from the fuel tank 2 into the sub tank 20. The sub tank 20 stores the fuel therein.

The cap member 30 is made of resin and is formed in a reversed cup shape. An opening end of the cap member 30 is coaxially fitted together with an opening end of the sub tank 20 by insertion. The cap member 30 is accommodated in the fuel tank 2 and closes the opening end of the sub tank 20. The cap member 30 has holding portions 301 and 302 for respectively holding the pump unit 50 and the fuel level sensor 60. Furthermore, it has a cylindrical accommodating portion 300 for accommodating therein a supporting pipe 41 of the adjusting mechanism 40.

As shown in FIGS. 1 and 2, the adjusting mechanism 40 has the supporting pipe 41, a pair (first and second) of intermediate members 42 and 48, and an elastic member 43. The supporting pipe 41 is made of metal and is formed in a long tubular shape. The supporting pipe 41 is inserted into the accommodating portion 300 of the cap member 30, so that the supporting pipe 41 is movable in an axial direction thereof with respect to the accommodating portion 300.

The first intermediate member 42 is made of resin and is formed in a double-tube shape. The first intermediate member 42 is coaxially accommodated in the accommodating portion 300, wherein the supporting pipe 41 is inserted between an inner tube portion 420 and an outer tube portion 421. A lower end 41b of the supporting pipe 41 is engaged with a stopper portion 420a outwardly projecting from the inner tube portion 420, so that the supporting pipe 41 is fixed to the first intermediate member 42. The intermediate member 42 is movably engaged with a pair of longitudinal grooves 300b, which are formed in an inner peripheral surface 300a of the accommodating portion 300 and extending in the axial direction, so that a relative movement of the intermediate member 42 with respect to the accommodating portion 300 in a circumferential direction is restricted while a relative movement thereof in the axial direction is allowed. According to the above structure, such parts and/or components (the sub tank 20, the cap member 30, the pump unit 50 and the fuel level sensor 60) which are integrally connected to each other (hereinafter, collectively referred to as an integral components 20, 30, 50, 60) are movable with respect to the supporting pipe 41 in the axial direction thereof, while a relative movement of the integral components 20, 30, 50, 60 with respect to the supporting pipe 41 in a rotational direction (the circumferential direction) thereof is restricted.

The second intermediate member 48 is made of resin and is likewise formed in a double-tube shape. An upper end portion (41a) of the supporting pipe 41 is inserted between an inner tube portion 480 and an outer tube portion 481. The supporting pipe 41 is attached to the fixed cylindrical portion 100 of the flanged portion 10 by a snap-fit coupling. An upper end 41a of the supporting pipe 41 is engaged with a stopper portion 480a outwardly projecting from the inner tube portion 480, so that the supporting pipe 41 is fixed to the second intermediate member 48. According to the above structure, the integral components 20, 30, 50, 60 are connected to the flanged portion 10 by the supporting pipe 41.

The elastic member 43 is composed of a coil spring in the present embodiment, which is arranged between the first intermediate member 42 and a bottom 300c of the accommodating portion 300. The elastic member 43 generates a spring force in the axial direction of the supporting pipe so as to bias the integral components 20, 30, 50, 60 (including the accommodating portion 300) in a downward direction toward the bottom wall 2c of the fuel tank 2. As a result, the bottom portion 20a of the sub tank 20 is brought into contact with the bottom wall 2c of the fuel tank 2, in dependently from specifications, manufacturing tolerance, deformation or the like of the fuel tank 2. According to the functions of the elastic member 43 as well as the intermediate members 42 and 48, and the integral components 20, 30, 50, 60 are stably located on the bottom wall 2c of the fuel tank 2.

Figure 4:
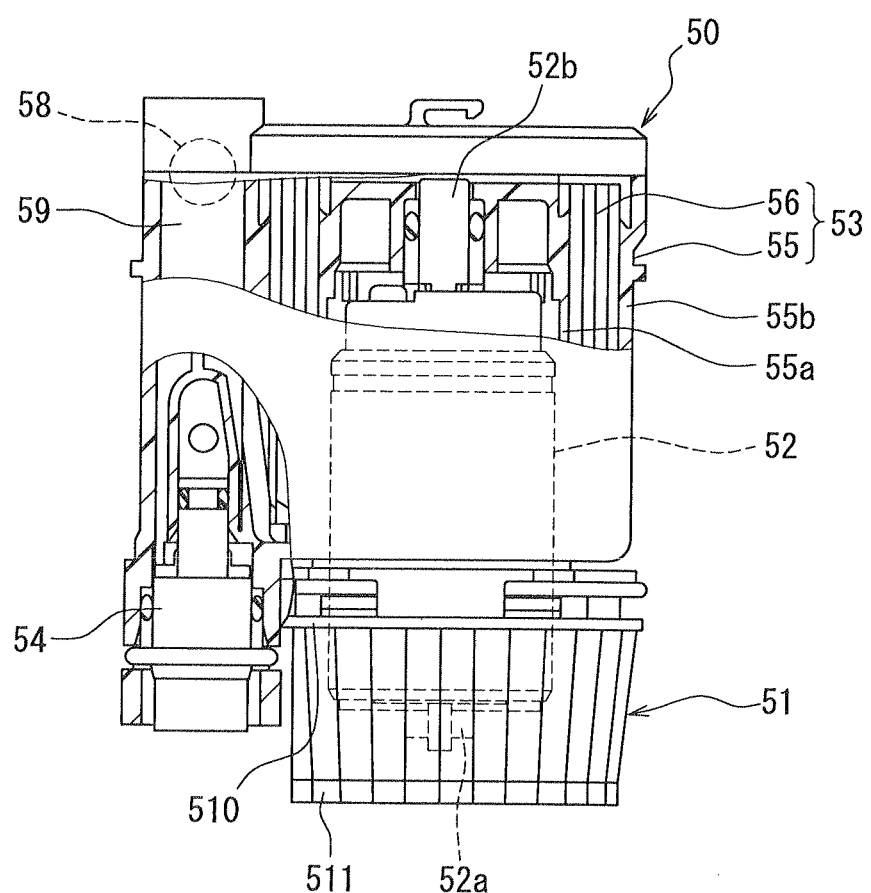
FIG. 4 is a schematic partial cross sectional view showing a pump unit of the fuel supply apparatus according to the first embodiment of the present disclosure.
Figure 5:
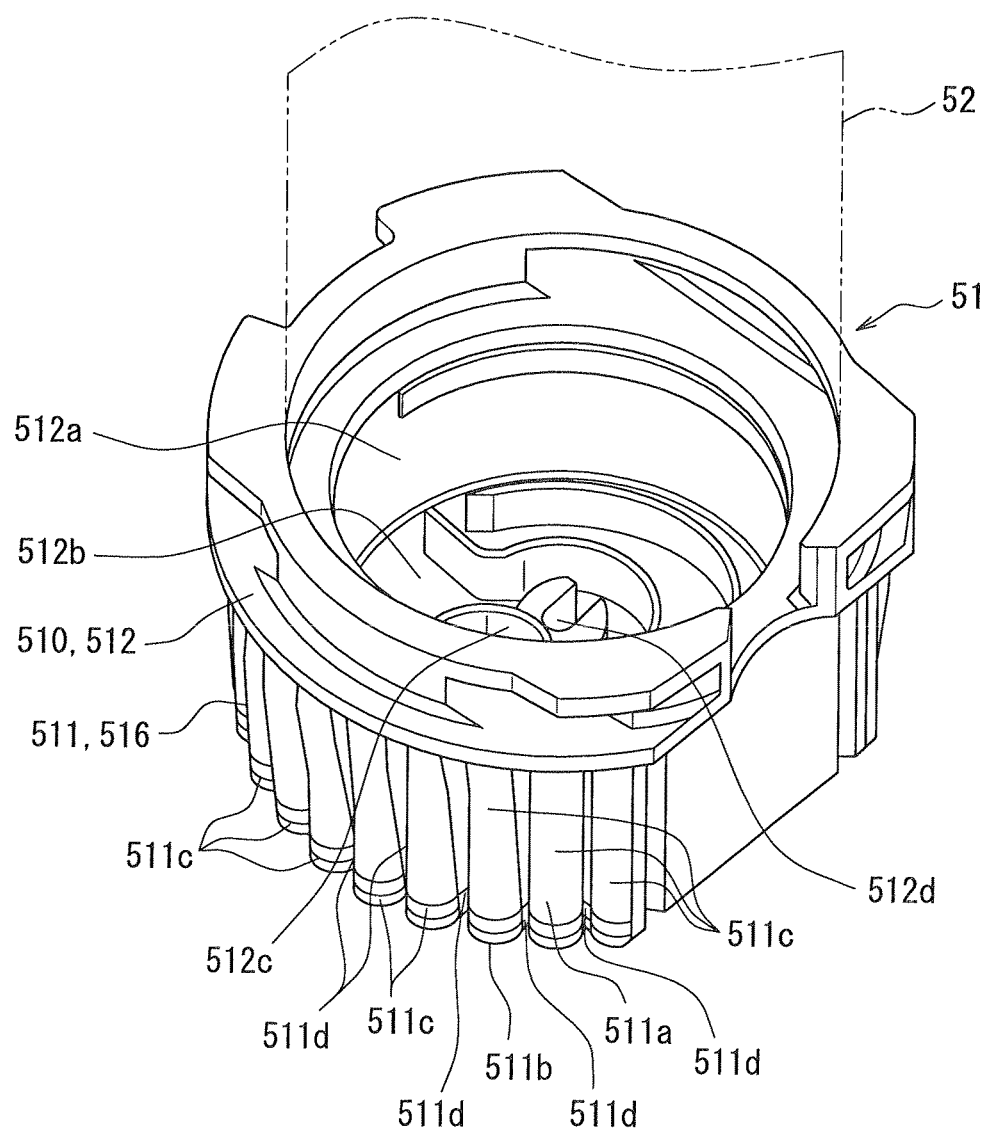
FIG. 5 is a schematic perspective view showing a suction filter of the fuel supply apparatus according to the first embodiment of the present disclosure.

A lower side portion of the pump unit 50 is accommodated in the sub tank 20, while an upper side portion thereof upwardly protrudes from the cap member 30. As shown in FIGS. 1, 2 and 4, the pump unit 50 is composed of a suction filter 51, the electric pump 52, flexible wires 57 and 67, a fuel filter 53, a flexible tube 58 and the pressure regulator 54.

The suction filter 51 is provided at a lowermost portion of the pump unit 50. The suction filter 51, which is connected to a suction port 52a of the electric pump 52, removes relatively large extraneous materials in the fuel which will be sucked into the electric pump 52 from the sub tank 20.

The electric pump 52 is provided in the pump unit 50 above the suction filter 51 and has the suction port 52a and a discharge port 52b, each of which is respectively directed in the downward or the upward direction. As shown in FIG. 2, the electric pump 52 has a rotating member 52d in a pump chamber 52g connected to the suction port 52a and the discharge port 52b, wherein the rotating member 52d is rotated by an electric motor 52e. According to the present embodiment, the rotating member 52d is composed of a disc shaped impeller having multiple blade grooves in its circumferential direction. The rotating member 52d is accommodated in the pump chamber 52g, so that an axial direction thereof corresponds to the vertical direction of the pump unit 50. The electric motor 52e is electrically connected to the terminal of the electrical connector 12 via the flexible wire 57, so that electric power can be supplied to the electric motor 52e via the terminal to thereby rotate the rotating member 52d. The fuel in the sub tank 20 is sucked by the rotation of the rotating member 52d into the suction port 52a through the suction filter 51. Then, the fuel is pressurized in the pump chamber 52g by operation of the blade grooves of the rotating member 52d and such pressurized fuel is pumped out from the discharge port 52b.

As shown in FIGS. 1, 2 and 4, the fuel filter 53 is provided at the upper side portion of the pump unit 50 so as to cover an outer periphery of the electric pump 52. A filter casing 55, which is one of parts for forming the fuel filter 53, is made of resin and is formed in a double tube shape (an inner and an outer tube portion 55a, 55b). The electric pump 52 is coaxially arranged in the inner tube portion 55a of the filter casing 55. A filter element 56, which is another part for forming the fuel filter 53, is made of filter material in a honeycomb shape. The filter element 56 is arranged between the inner and outer tub portions 55a and 55b.

A space between the inner and outer tube portions 55a and 55b is divided by the filter element 56 into an upstream side and a downstream side for the fuel flow, wherein the upstream side is communicated to the discharge port 52b of the electric pump 52 and the downstream side is communicated to a fuel outlet 59 of the fuel filter 53. The fuel outlet 59 is connected to the fuel supply pipe 11 via the flexible tube 58. According to the above structure, the fuel pumped out from the discharge port 52b flows into the space between the inner and outer tube portions 55a and 55b, so that micro extraneous materials are removed by the filter element 56. The filtered fuel is supplied from the fuel outlet 59 to the fuel supply pipe 11.

As shown in FIG. 4, the pressure regulator 54 is provided in the pump unit 50 at an outer side portion of the fuel filter 53. A part of the fuel, which will be supplied to the fuel supply pipe 11 arranged at the outside of the fuel tank 2, flows into the pressure regulator 54 communicated to the fuel outlet 59 of the fuel filter 53. The pressure regulator 54 regulates the pressure of the fuel to be supplied to the fuel supply pipe 11 and the surplus fuel during the pressure regulation is discharged to the jet nozzle 23 of the jet pump 21.

As shown in FIG. 1, the fuel level sensor 60 is supported by the holding portion 302 on the cap member 30, so that the fuel level sensor 60 is located at the outside of the sub tank 20. The fuel level sensor 60 is electrically connected to the terminal of the electrical connector 12 via the flexible wire 67. When the electric power is supplied to the fuel level sensor 60, it detects a level of the fuel remaining in the fuel tank 2 based on a rotational angle of an arm 62, which is connected to a float (not shown) floating on the fuel surface in the fuel tank 2.

A structure of the suction filter 51, which is a characterizing portion of the fuel supply apparatus 1, will be explained more in detail. As shown in FIGS. 2 and 4, the suction filter 51 is composed of a core member 510 and a filter element sheet 511.

As shown in FIGS. 2 and 5 to 9, the core member 510 is composed of a cap element 512 and a protector element 513, which are assembled together with each other. The cap element 512 has a side wall portion 512a and a bottom wall portion 512b, which are made of resin and formed in a cup shape. The suction port 52a as well as a portion of the electric pump 52 forming the pump chamber 52g is accommodated in the inside of the side wall portion 512a. An upper end of the side wall portion 512a is fixed to the filter casing 55 by a clip 514 (in particular, as shown in FIG. 2). As shown in FIGS. 5 to 8, a through-hole 512c is formed in the bottom wall portion 512b, so that the suction port 52a of the electric pump 52 is inserted into such through-hole 512c. In addition, a fuel hole 512d (which is another through-hole) is formed in the bottom wall portion 512b at a center thereof neighboring to the through-hole 512c, so that the fuel in the cap element 512 can pass through such fuel hole 512d in the downward direction.

Figure 6:
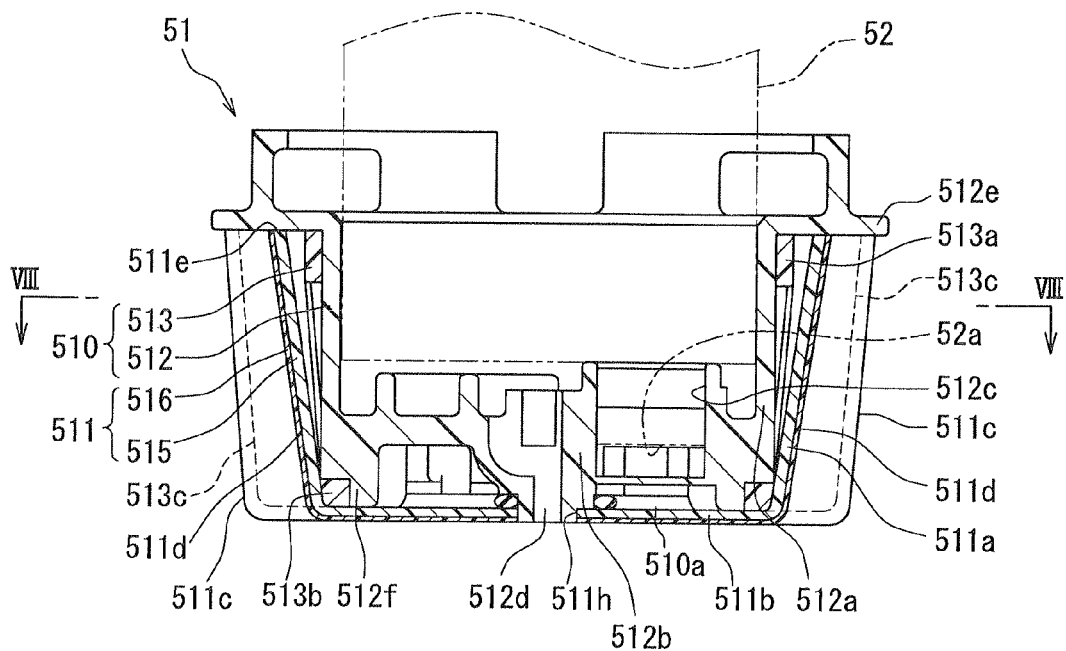
FIG. 6 is a schematic cross sectional view, taken along a line VI-VI in FIG. 10, showing the suction filter of the fuel supply apparatus according to the first embodiment of the present disclosure.
Figure 7:
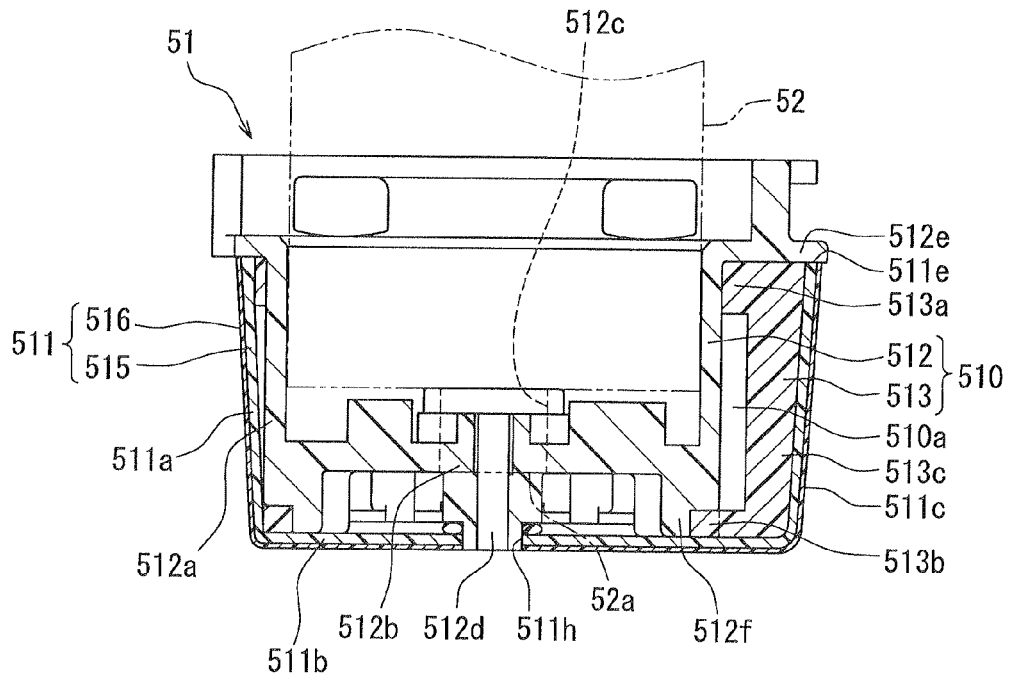
FIG. 7 is a schematic cross sectional view, taken along a line VII-VII in FIG. 10, showing the suction filter of the fuel supply apparatus according to the first embodiment of the present disclosure.
Figure 8:
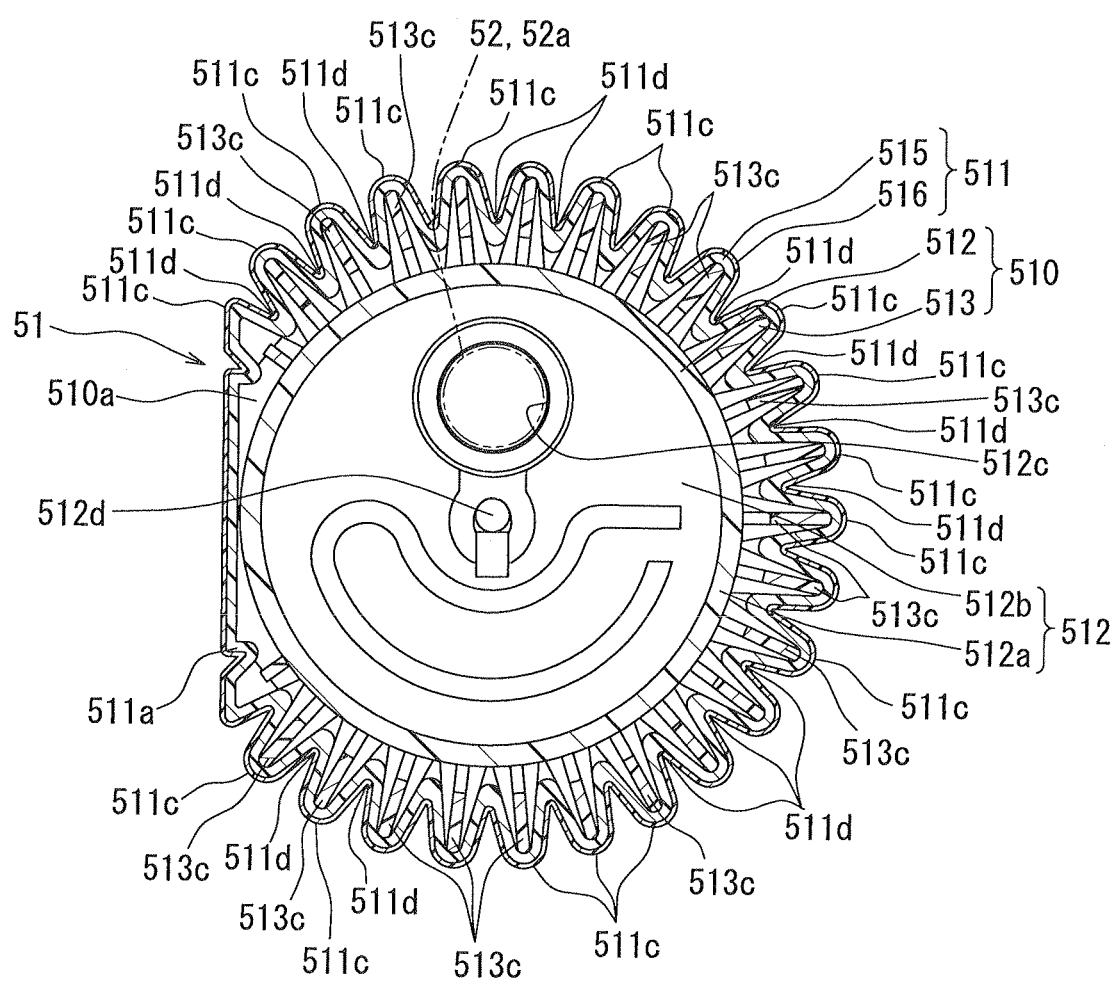
FIG. 8 is a schematic cross sectional view, taken along a line VIII-VIII in FIG. 6, showing the suction filter of the fuel supply apparatus according to the first embodiment of the present disclosure.
Figure 9:
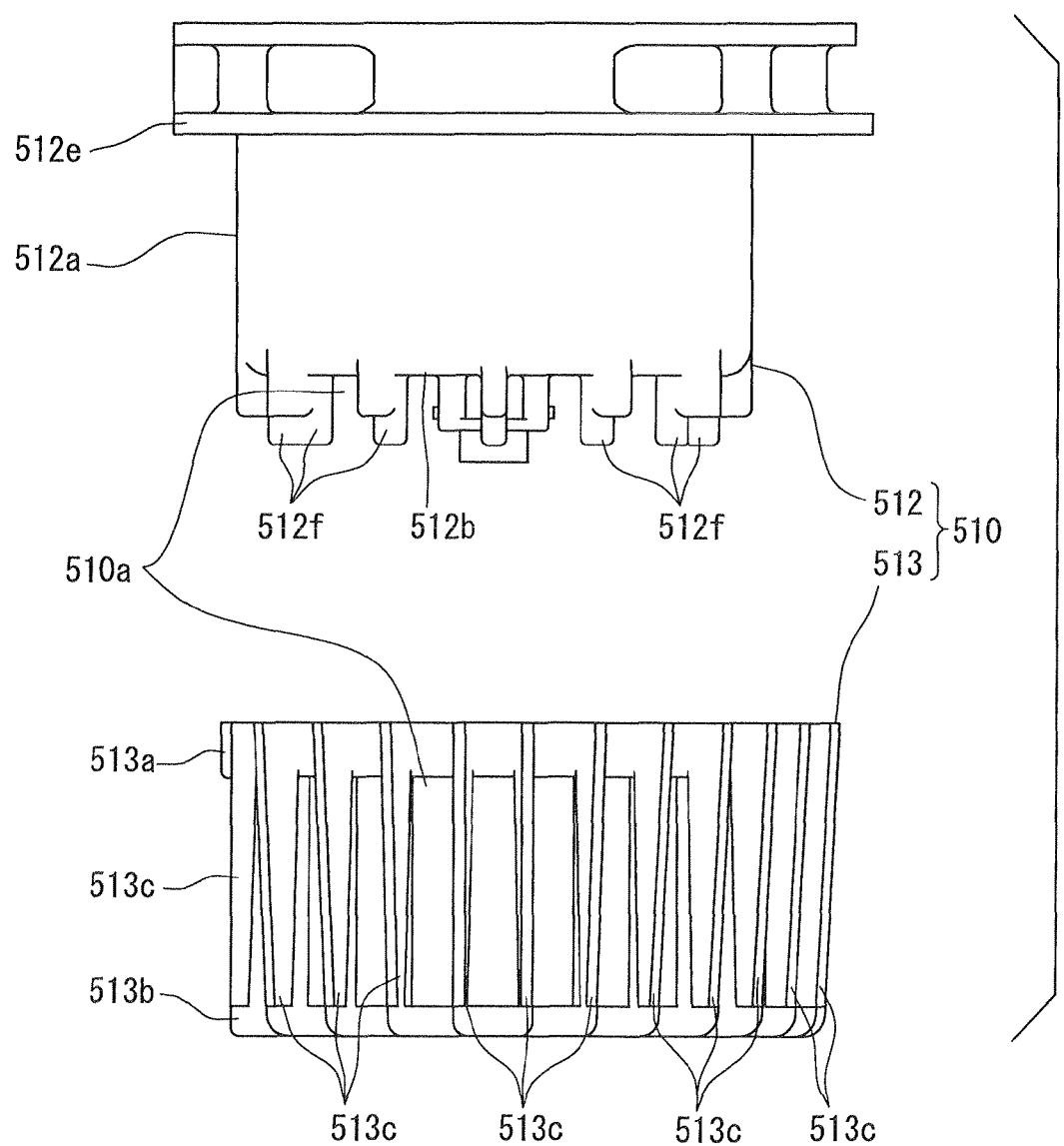
FIG. 9 is an exploded side view schematically showing a core member of the suction filter of the fuel supply apparatus according to the first embodiment of the present disclosure.

As shown in FIGS. 6, 7 and 9, the protector element 513 is made of resin to form a frame having multiple ribs 513c between a pair of (an upper and a lower) circular portions 513a and 513b. The cap element 512 is coaxially inserted into the protector element 513, so that the upper circular portion 513a of the protector element 513 is brought into contact with a flange portion 512e of the cap element 512, which is outwardly projected from an upper end of the side wall portion 512a. The lower circular portion 513b is engaged with multiple holding projections 512f, which are projected from the bottom wall portion 512b in the downward direction. As a result, the lower circular portion 513b is arranged at a position remote from the bottom wall portion 512b in the axial direction of the electric pump 52.

As shown in FIGS. 6 to 9, the multiple ribs 513c are arranged at equal intervals in a circumferential direction of the protector element 513. The ribs 513c are provided in such an area of the protector element 513, which surrounds the suction port 52a of the electric pump 52 (accommodated in the cap element 512) and which corresponds to a three-fourth (¾) portion of a circumferential length of the protector element 513. Each of the ribs 513c is formed in a long flat plate shape, which extends in the axial direction between the upper and lower circular portions 513a and 513b, and each rib 513c is formed at such a position remote from the side wall portion 512a of the cap element 512. According to the above structure, spaces are formed between the ribs 513c and the cap element 512 and between the lower circular portion 513b and the cap element 512, to thereby form a fuel passage 510a therein communicated to the suction port 52a of the electric pump 52 via the through-hole 512c of the cap element 512.

Figure 10:
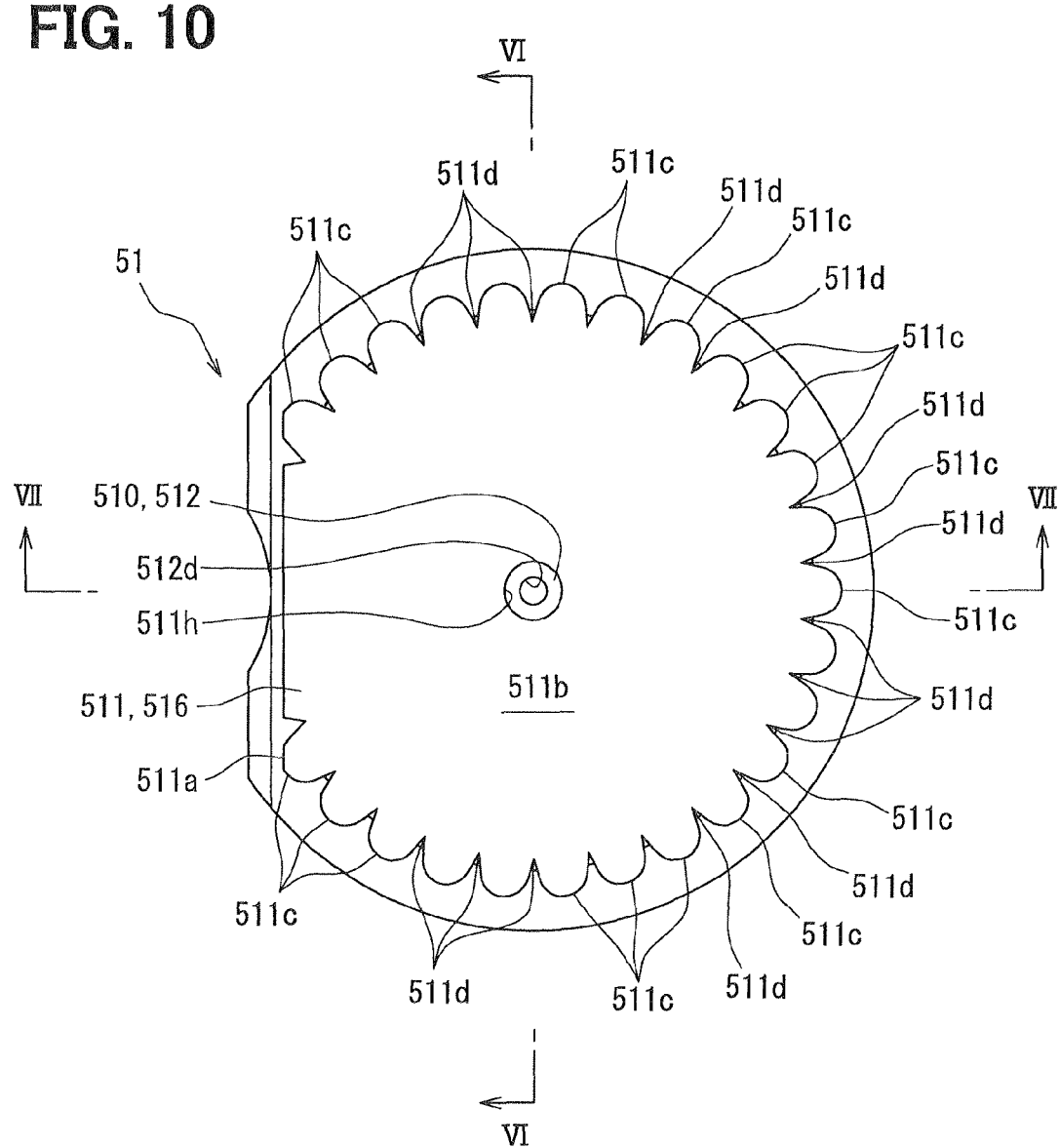
FIG. 10 is a schematic bottom view showing the suction filter of the fuel supply apparatus according to the first embodiment of the present disclosure.
Figure 11:
FIG. 11 is an enlarged cross sectional view showing a filter element sheet of the suction filter of the fuel supply apparatus according to the first embodiment of the present disclosure.

As shown in FIGS. 5 to 8 and 10, the filter element sheet 511 is formed in a cup shape having a side wall portion (511a) and a bottom wall portion 511b, which is formed along the shape of the core member 510. The side wall portion of the filter element sheet 511 covering the protector element 513 of the core member 510 has multiple half-tube portions 511a in a wave shape, wherein the filter element sheet 511 at each of the half-tube portions 511a is bent (or folded) along the respective rib 513c to form a mountain fold portion 511c outwardly protruding and a valley fold portion 511d inwardly recessed between the respective neighboring ribs 513c. According to the above structure, the mountain fold portions 511c and the valley fold portions 511d are alternately arranged in the circumferential direction of the cup-shaped filter element sheet 511, as shown in FIG. 10.

As shown in FIGS. 6 and 7, an upper peripheral end She of the side wall portion (the half-tube portions 511a) of the filter element sheet 511 is fixed to the flange portion 512e of the cap element 512. The bottom wall portion 511b of the filter element sheet 511, which is on an opposite side of the upper peripheral end She in the axial direction, is formed in a flat plate shape facing to an inner bottom surface 20b of the sub tank 20, as shown in FIG. 2. As shown in FIGS. 6, 7 and 10, an aperture 511h is formed in the bottom wall portion 511b in its thickness direction so that the fuel hole 512d formed in the core member 510 is communicated to the outside of the suction filter 51. According to the present embodiment, the bottom wall portion 511b is spaced from the inner bottom surface 20b of the sub tank 20, and the suction filter 51 is held by the pump unit 50 so as to be floating in the sub tank 20.

The filter element sheet 511 is formed in a single layer or a multi layer structure of bonded textile, mesh fabric or filter paper or formed by a combination thereof being overlapped with each other. According to the present embodiment, as shown in FIGS. 6 to 8 and 11, the filter element sheet 511 is composed of a collecting sheet 515 and a cover sheet 516, which are overlapped with each other. The collecting sheet 515 is the bonded textile made of resin with fine texture (synthetic fabric) for collecting extraneous materials contained in the fuel passing from the sub tank 20 into the fuel passage 510a. The cover sheet 516 is the mesh fabric made of resin with coarse texture. The cover sheet 516 covers the collecting sheet 515 of the cup shape from its outer side surface and from its outer bottom surface, so as to protect the collecting sheet 515. According to the present embodiment, the filter element sheet 511, which is made of two resin sheets 515 and 516, is fixed to the flange portion 512e of the resin-made cap element 512 by welding or adhesive bonding.

As above, the fuel from the sub tank 20 passes through the suction filter 51 and flows to the suction port 52a of the electric pump 52, so that the fuel is filtrated by the filter element sheet 511 and then flows to the suction port 52a through the fuel passage 510a of the core member 510. In addition, a part of the fuel, which is pooled in the space of the core member 510 between the bottom wall portion 512b and the electric pump 512, can be discharged to the outside of the suction filter 51 through the fuel hole 512d and the aperture 511h.

Figure 13:
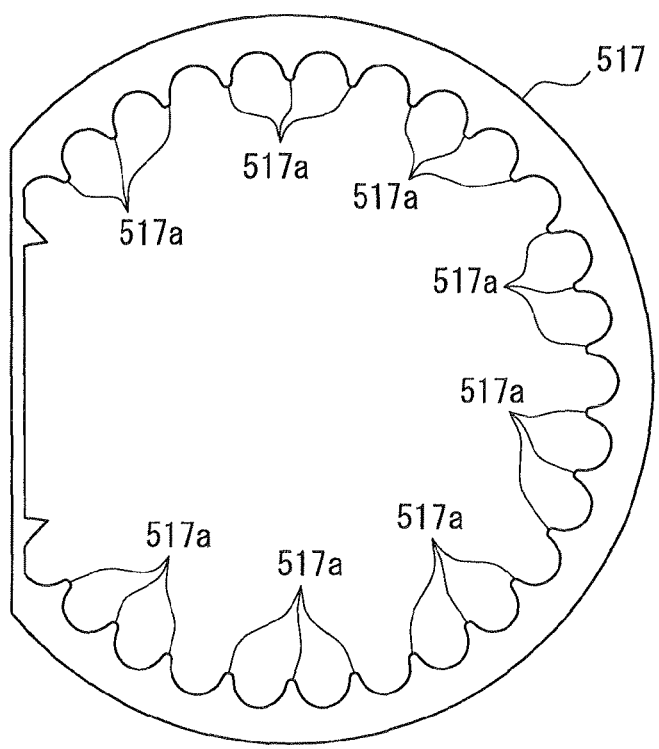
FIG. 13 is a schematic bottom view showing a ring jig to be used in the manufacturing process for the suction filter of the fuel supply apparatus according to the first embodiment of the present disclosure.

A method of manufacturing the above suction filter 51 will be explained. As shown in FIGS. 12A and 12B, the filter element sheet 511 is put on the protector element 513 to cover the same and formed in the cup shape. The protector element 513 is assembled to the cap element 512 to form the core member 510. In this assembling process, a ring jig 517 shown in FIGS. 12A and 13 is used. The ring jig 517 is formed in an almost circular shape having multiple projections 517a, each of which is projected in an inward direction from such a portion of the ring jig 517 corresponding to a portion of the protector element 513 between the neighboring ribs 513c. More exactly, the ring jig 517 is moved from its lower position to its upper position, as shown in FIG. 12A, wherein the filter element sheet 511 put on the lower circular portion 513b is interposed between the respective ribs 513c and the respective projections 517a. In other words, the ring jig 517 is moved from the lower position in which it surrounds the outer surface of the filter element sheet 511 at the lower circular portion 513b of the protector element 513 to the upper position in which it surrounds the outer surface of the filter element sheet 511 at the upper circular portion 513a of the protector element 513. According to the above assembling process, a portion of the filter element sheet 511 covering the ribs 513c, that is the side wall portion, is formed as multiple half-tube portions 511a having the mountain fold portions 511c and the valley fold portions 511d, which are alternately arranged in the circumferential direction, as shown in FIG. 12B.

In the following process shown in FIG. 12C, the ring jig 517 is removed from the core member 510 and the upper peripheral end 511e of the filter element sheet 511 is fixed to the flange portion 512e of the cap element 512 of the core member 510. According to the present embodiment, at least one of the upper peripheral end 511e and the flange portion 512e is molten so as to weld them to each other, or adhesive material is applied to at least one of them so as to bond them to each other.

In a case that a melt point of the flange portion 512e is lower than that of the upper peripheral end 511e, and when the upper peripheral end 511e and the flange portion 512e are welded to each other, the molten resin flows into the texture pattern of the cover sheet 516 (the mesh fabric) of the upper peripheral end 511e so that sealing performance between the upper peripheral end 511e and the flange portion 512e can be increased by anchoring effect.

According to the present embodiment, the filter element sheet 511 of the suction filter 51, which is provided in the fuel supply apparatus 1, is formed in the cup shape having a large surface area (in the cylindrical shape having the bottom). The pressure loss is properly controlled when the fuel in the sub tank 20 is sucked into the suction port 52a in accordance with the rotation of the electric motor 52e. A performance decrement of the electric pump 52, which may be caused by possible vapor generation (for example, a vapor-lock situation in which a vehicle accelerating operation may be adversely affected), can be avoided, and/or shortened service life of the filter element sheet 511 to be caused by clogging can be also avoided.

In addition, according to the present embodiment, the bottom wall portion 511b of the cup-shaped filter element sheet 511 faces to the inner bottom surface 20b of the sub tank 20, and thereby the fuel between the bottom wall portion 511b and the inner bottom surface 20b can be also sucked into the suction port 52a, the suction performance of the fuel (the fuel cut-off performance) can be increased.

In addition, the cup-shape for the filter element sheet 511 can be easily formed by covering the core member 510 by the filter element sheet 511 and bending (folding) the filter element sheet 511 along the core member 510. Accordingly, the manufacturing time for the suction filter 51, furthermore the manufacturing time for the fuel supply apparatus 1, can be reduced to thereby achieve a high productivity.

According to the embodiment, the through-hole 512c is formed in the cap element 512, into which the suction port 52a of the electric pump 52 is inserted, so that the suction port 52a is communicated to the fuel passage 510a. The fuel in the suction port 52a may possibly leak out via a boundary surface between an outer peripheral surface of the suction port 52a and an inner peripheral surface of the through-hole 512c. When the bottom wall portion 512b of the cap element 512 is pushed down by the fuel leaked out between the electric pump 52 and the bottom wall portion 512b, the suction port 52a may be separated from the through-hole 512c and thereby the suction portion 52a may become out of communication with the fuel passage 510a.

However, according to the present embodiment, the fuel hole 512d is further formed in the bottom wall portion 512b at the place adjacent to the through-hole 512c, wherein the fuel hole 512d is communicated to the outside of the filter element sheet 511. Therefore, the fuel leaked into the space between the electric pump 52 and the bottom wall portion 512b of cap element 512 can be discharged to the outside of the suction filter 51 via the fuel hole 512d and the aperture 511h formed in the filter element sheet 511. As a result, it is possible to prevent the suction port 52a from becoming out of communication with the fuel passage 510a due to the fuel leakage into the cap element 512. The performance decrement of the electric pump 52 can be thus avoided.

The filter element sheet 511 is formed in the cup-shape by use of the core member 510 having the multiple ribs 513c arranged at equal intervals in the circumferential direction, so that the mountain fold portions 511c are formed by folding the filter element sheet 511 along the ribs 513c, while the valley fold portions 511d are formed by folding (recessing) the filter element sheet 511 toward spaces between the ribs 513c. Since the mountain fold portions 511c and the valley fold portions 511d are alternately formed in the circumferential direction, that is a direction surrounding the suction portion 52a, the surface area of the filter element sheet is remarkably increased. As a result, the life duration of the filter element sheet 511 as well as the performance of the electric pump 52 can be improved. In addition, since the cup shape of the filter element sheet 511 having the multiple mountain fold portions 511c and the valley fold portions 511d can be easily manufacture by simply covering the ribs 513c with the filter element sheet 511 and moving the ring jig 517 in the vertical direction, it becomes possible to manufacture the suction filter 51 in a shorter time period, to thereby increase the productivity.

According to the present embodiment, since the collecting sheet 515 of the filter element sheet 511 for collecting the extraneous materials is protected by the cover sheet 516, which is made of the mesh fabric with coarse texture, the life duration of the filter element sheet 511 is increased. In addition, since the upper peripheral end 511e of the filter element sheet 511 is fixed to the flange portion 512e of the cap element 512 for the core member 510 by the welding or the adhesive bonding, the gap between the core member 510 and the filter element sheet 511 can be surely sealed. In addition, the welding or the adhesive bonding can be simply done by covering the core member 510 with the filter element sheet 511. Therefore, the suction filter 51 can be manufactured in a shortened time period, to thereby increase the productivity.

Second Embodiment

Figure 14:
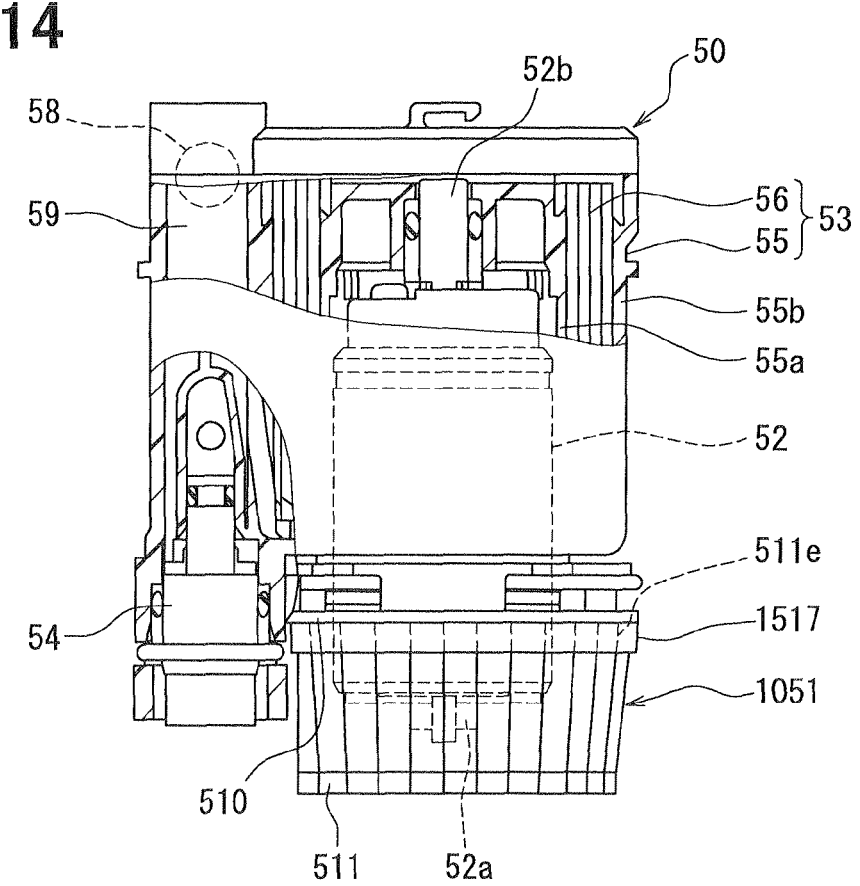
FIG. 14 is a schematic partial cross sectional view showing a pump unit of the fuel supply apparatus according to a second embodiment of the present disclosure.

A second embodiment of the present disclosure is a modification of the first embodiment. As shown in FIG. 14, a suction filter 1051 of the second embodiment has a ring member 1517, in order that the upper peripheral end 511e of the filter element sheet 511 is fixed to the core member 510 by means of the ring member 1517.

Figure 15:
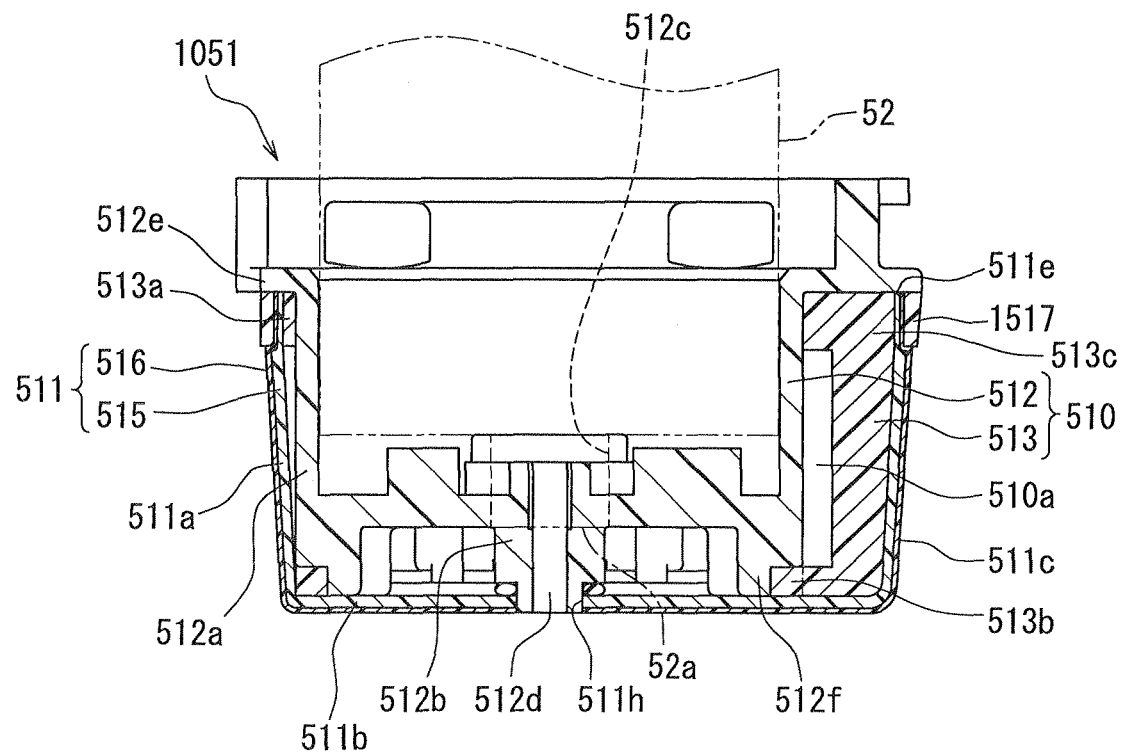
FIG. 15 is a schematic cross sectional view, corresponding to FIG. 7, showing the suction filter of the fuel supply apparatus according to the second embodiment of the present disclosure.
Figure 16:
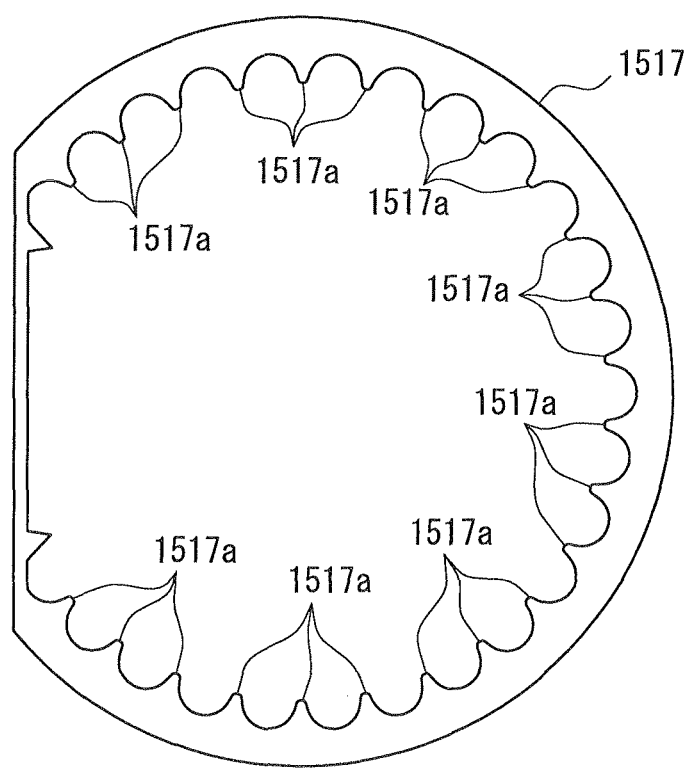
FIG. 16 is a schematic bottom view showing a ring member, which is one of parts for forming the suction filter of the fuel supply apparatus according to the second embodiment of the present disclosure.

As shown in FIGS. 15 and 16, the ring member 1517 has a similar structure to the ring jig 517 of the first embodiment. Namely, multiple projections 1517a are formed so as to inwardly project into respective spaces between the neighboring ribs 513c of the protector element 513. According to the above structure, the upper peripheral end 511e of the filter element sheet 511 is interposed between the ring member 1517 and the respective ribs 513c of the protector element 513. In other words, the upper peripheral end 511e of the filter element sheet 511 is pressed against the respective ribs 513c from the outer periphery thereof, to thereby fix the filter element sheet 511 to the cap element 512. When the upper peripheral end 511e is compressed so that a thickness of the filter element sheet 511 is reduced to a value smaller than 80% of the thickness before being compressed, the gap between the upper peripheral end 511e and the core member 510 can be surely sealed.

When the suction filter 1051 of the second embodiment will be manufactured, the ring member 1517 is used instead of the ring jig 517 in the process shown in FIGS. 12A and 12B, so that the filter element sheet 511 is formed in the predetermined shape (the cup shape having the multiple mountain and valley fold portions) and at the same time the upper peripheral end 511e of the filter element sheet 511 is fixed to the core member 510. In other words, the step for forming the filter element sheet 511 in the predetermined shape and the step for fixing the filter element sheet 511 to the core member 510 can be carried out at the same time in one process. According to the present embodiment, the suction filter 1051 can be manufactured in the further shortened time, wherein the filter element sheet 511 and the ring member 1517 are assembled to the core member 510 in a sequential order. Accordingly, the productivity can be increased.

Third Embodiment

Figure 17:
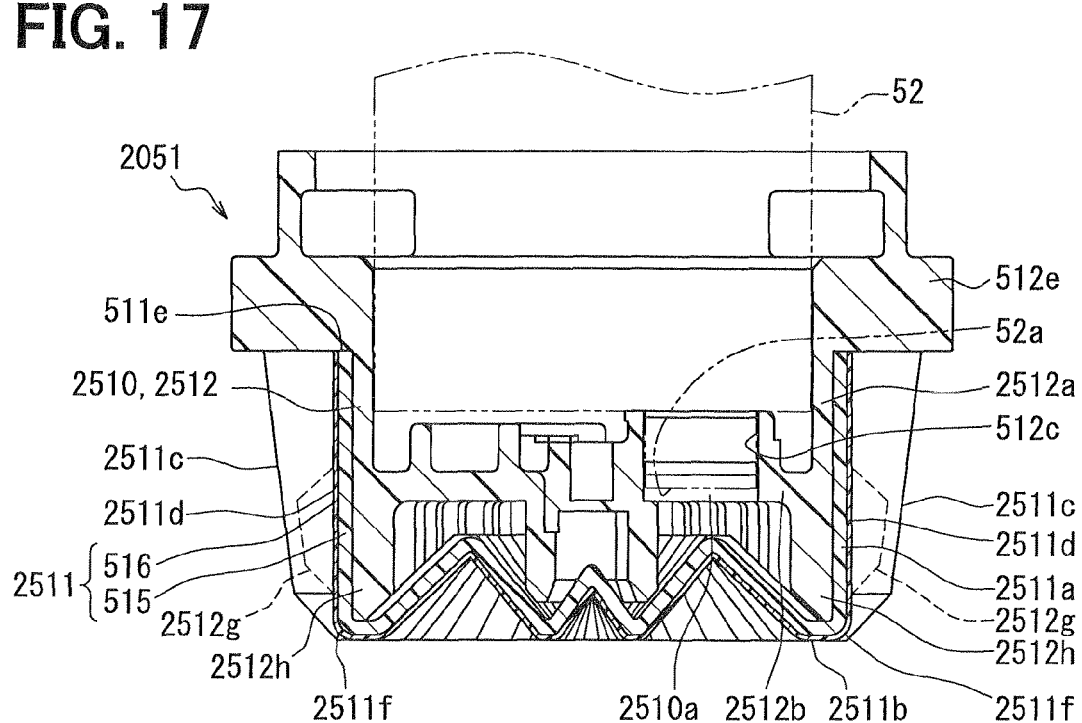
FIG. 17 is a schematic cross sectional view, taken along a line XVII-XVII in FIG. 22, showing the suction filter of the fuel supply apparatus according to a third embodiment of the present disclosure.
Figure 18:
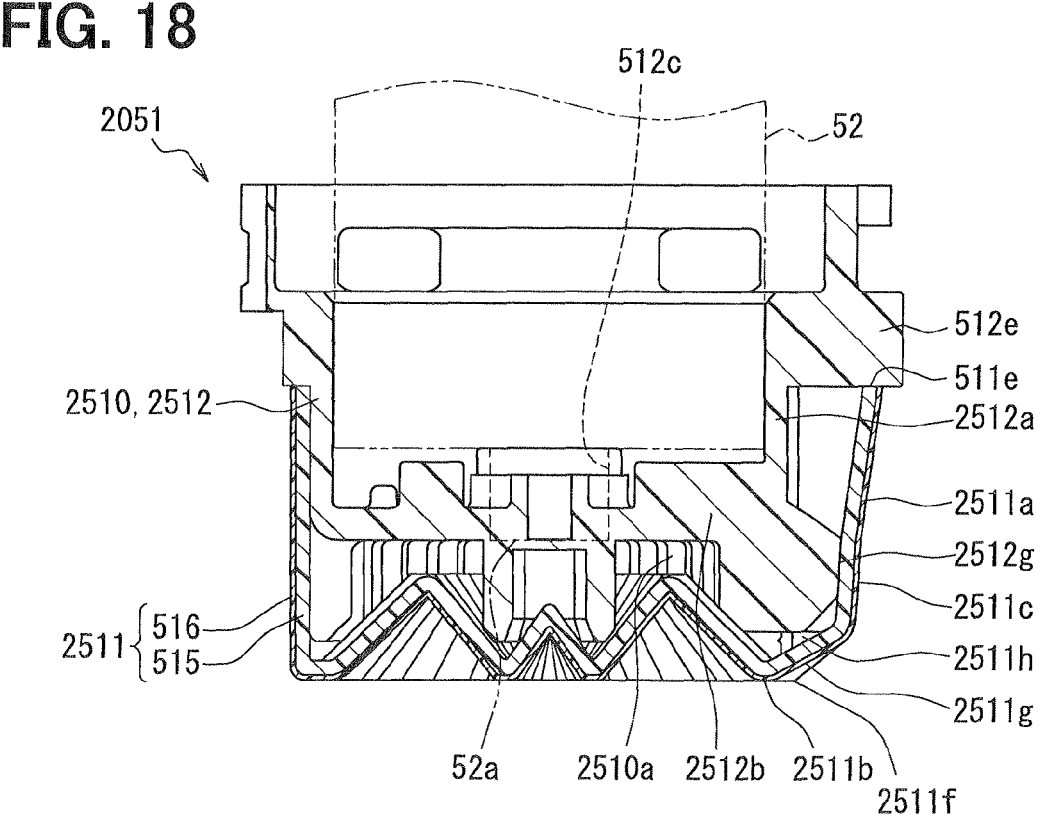
FIG. 18 is a schematic cross sectional view, taken along a line in FIG. 22, showing the suction filter of the fuel supply apparatus according to the third embodiment of the present disclosure.
Figure 19:
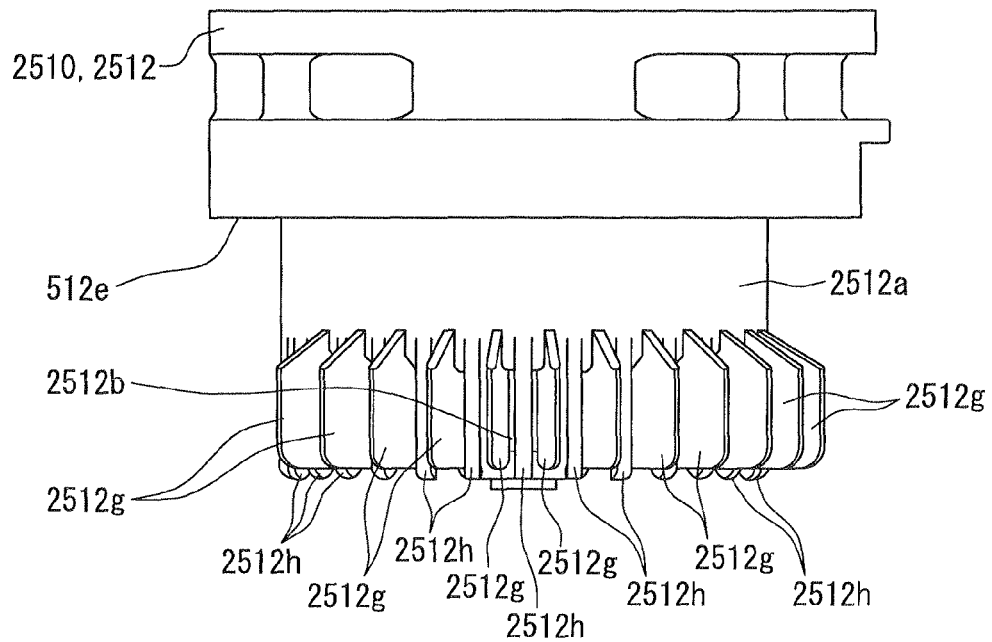
FIG. 19 is a schematic side view showing a core member of the suction filter of the fuel supply apparatus according to the third embodiment of the present disclosure.
Figure 20:
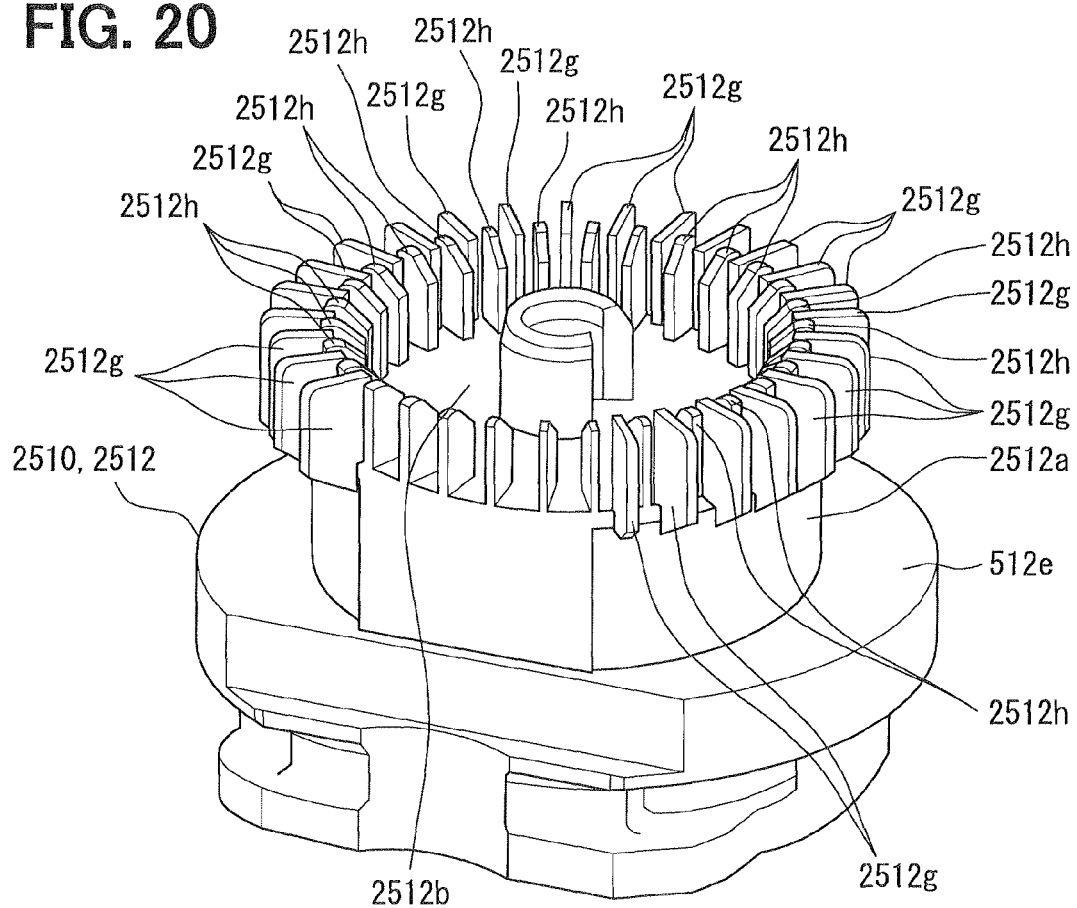
FIG. 20 is a schematic perspective view showing the core member of the suction filter of the fuel supply apparatus according to the third embodiment of the present disclosure.

A third embodiment of the present disclosure is a modification of the first embodiment. According to a suction filter 2051 of the third embodiment, as shown in FIGS. 17 and 18, a filter element sheet 2511 is formed in a cup shape, while a cap element 2512 of a core member 2510 has two different ribs 2512g and 2512h, which are alternately arranged in the circumferential direction of the core member 2510.

As shown in FIGS. 17 to 20, multiple first ribs 2512g are provided in such an area, which corresponds to a circumferential portion surrounding the suction port 52a to be accommodated in the cap element 2512 and which corresponds to a three-fourth (¾) portion of a circumferential length of the circumferential portion. The multiple first ribs 2512g are arranged at equal intervals in the circumferential direction of the cap element 2512.

Each of the first ribs 2512g is formed in a flat plate shape, which extends from a side wall portion 2512a of the cap element 2512 (which is also formed in a cup shape) in a radial outward direction and further extends from a bottom wall portion 2512b thereof in a downward direction.

The multiple second ribs 2512h are also arranged at equal intervals in the circumferential direction of the cap element 2512. Each of the second ribs 2512h is also formed in a flat plate shape, which extends from the bottom wall portion 2512b between the neighboring first ribs 2512g in the direction toward a bottom wall portion 2511b of the cup-shaped filter element sheet 2511. More exactly, each of the second ribs 2512h extends from the bottom wall portion 2512b in the downward direction in such a manner that the second ribs 2512h project further in the downward direction than the first ribs 2512g.

According to the present embodiment, as shown in FIGS. 17 and 18, such an element corresponding to the protector element 513 of the first embodiment can be eliminated from the core member 2510 by providing the above two different ribs 2512g and 2512h. A fuel passage 2510a is formed so that the fuel flows to the suction port 52a through spaces between the neighboring ribs 2512g and 2512h and the through-hole 512c. According to the present embodiment, such a fuel hole corresponding to the fuel hole 512d of the first embodiment is not formed in the bottom wall portion 2512b of the cap element 2512.

As shown in FIGS. 17, 18, 21 and 22, the filter element sheet 2511 is bent and/or folded along the core member 2510 to form tubular portions 2511a and bottom portions 2511b, each of which has a mountain fold portion 2511c, 2511f and a valley fold portion 2511d, 2511g. More exactly, the tubular portions 2511a are formed in such a manner that the filter element sheet 2511 is bent along the first ribs 2512g so as to form the first mountain fold portions 2511c and the first valley fold portions 2511d, which are valley-folded between the neighboring first ribs 2512g. In a similar manner, the bottom portions 2511b are so formed that the filter element sheet 2511 is bent along the second ribs 2512h so as to form the second mountain fold portions 2511f and the second valley fold portions 2511g, which are valley-folded between the neighboring second ribs 2512h.

Figure 21:
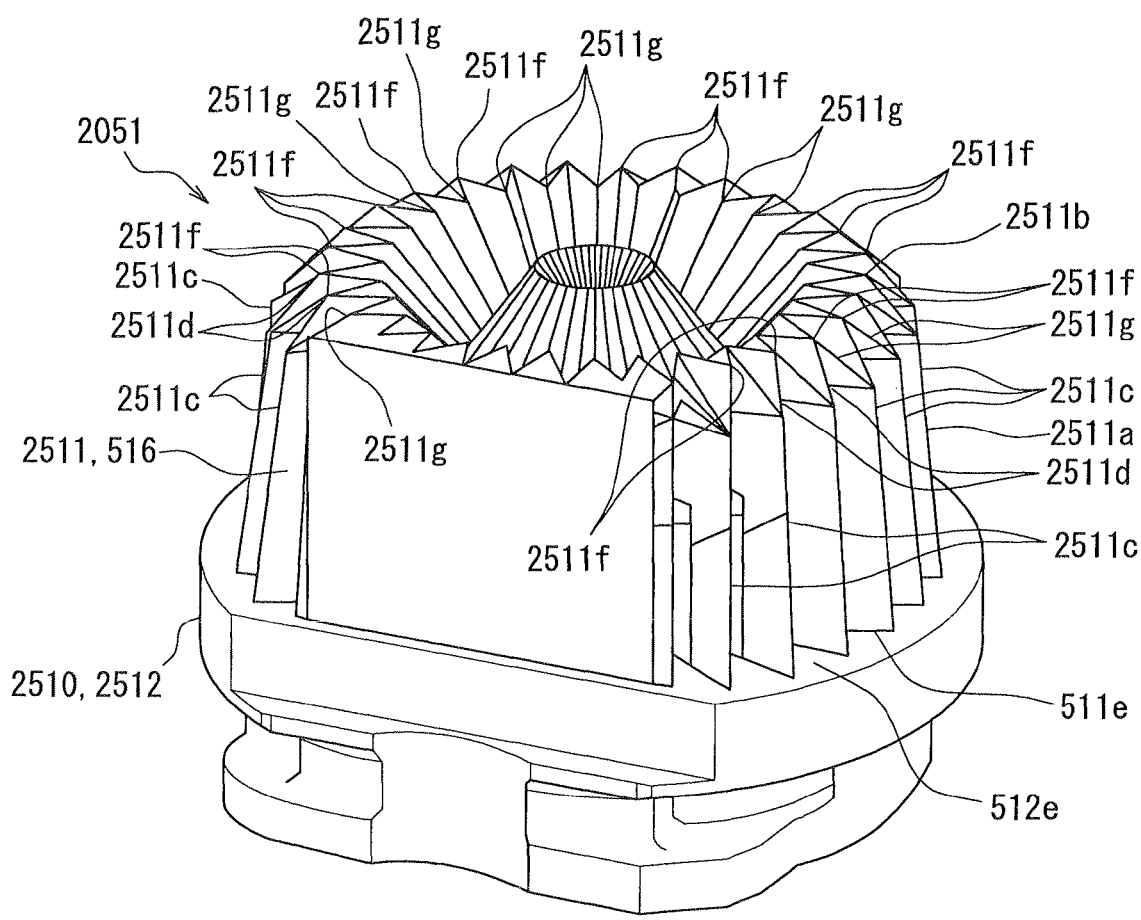
FIG. 21 is a schematic perspective view showing the suction filter of the fuel supply apparatus according to the third embodiment of the present disclosure.
Figure 22:
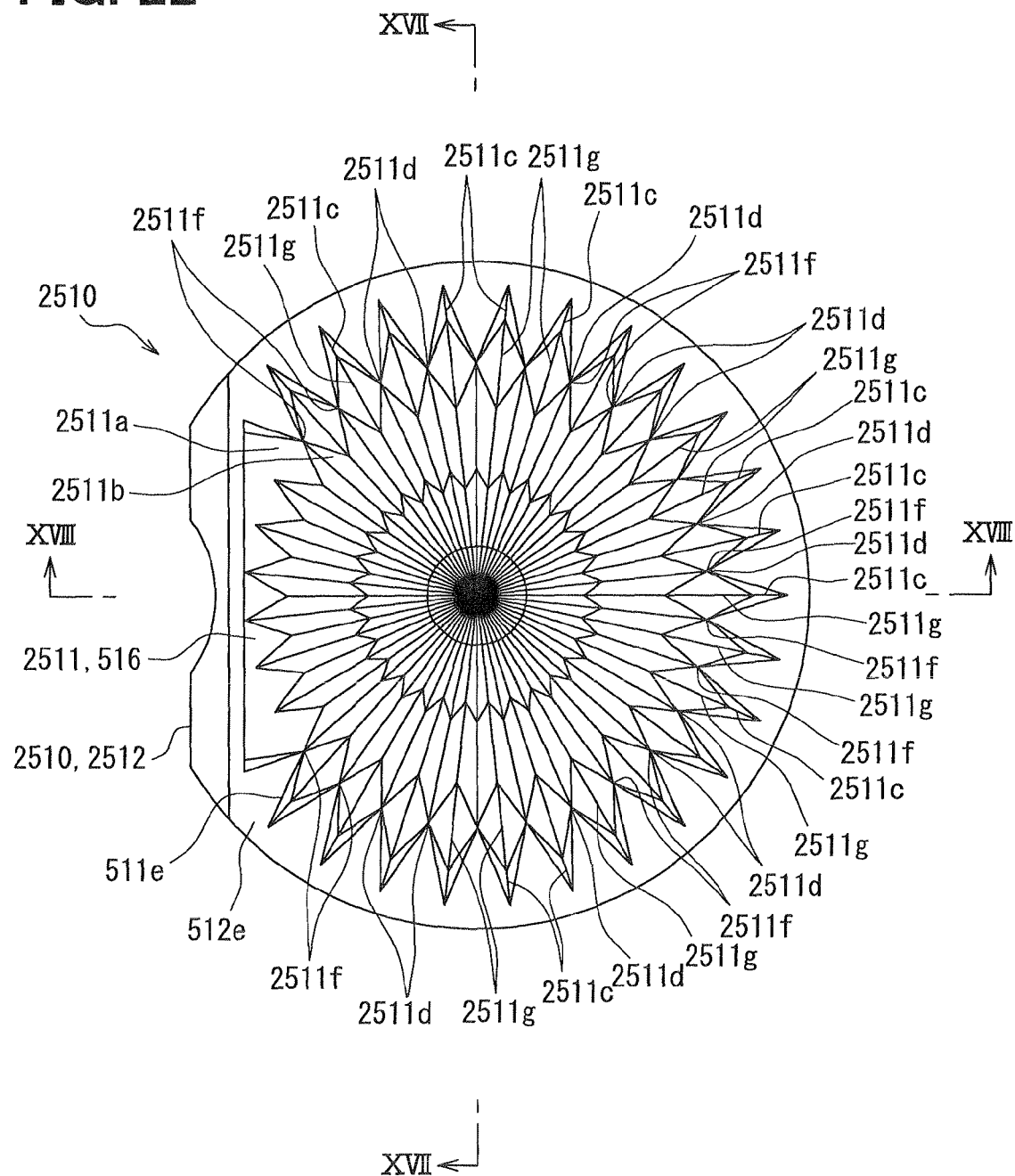
FIG. 22 is a schematic bottom view showing the suction filter of the fuel supply apparatus according to the third embodiment of the present disclosure.

According to the present embodiment, as shown in FIGS. 21 and 22, a folding direction of the filter element sheet 2511 at the second valley fold portion 2511g is reversed from a folding direction thereof at the first mountain fold portion 2511c, so that an edge line of the first mountain fold portion 2511c and an edge line of the second valley fold portion 2511g are aligned with each other. In a similar manner, the sheet folding direction at the second mountain fold portion 2511f is reversed from the sheet folding direction at the first valley portion 2511d, so that an edge line of the second mountain fold portion 2511f and an edge line of the first valley fold portion 2511d are aligned with each other. As a result, the first mountain fold portions 2511c and the first valley fold portions 2511d are alternately arranged in the tubular portions 2511a in its circumferential direction. In the similar manner, the second mountain fold portions 2511f and the second valley fold portions 2511g are alternately arranged in the bottom portions 2511b in its circumferential direction.

According to the present embodiment, such an aperture corresponding to the aperture 511h of the first embodiment is not formed in the bottom wall portions 2511b of the filter element sheet 2511.

When the suction filter 2051 is manufactured, a ring jig having projections at such portions corresponding to the respective valley fold portions 2511d and 2511g will be used, instead of the ring jig 517 of the first embodiment, in assembling steps corresponding to those of FIGS. 12A and 12B. In a manufacturing process for the suction filter 2051 of the third embodiment, the filter element sheet 2511 is put onto the core member 2510, the filter element sheet 2511 is sequentially bent and/or folded by the ring jig along the second ribs 2512h and then the first ribs 2512g to form the bottom portions 2511b and the tubular portions 2511a, and finally the upper peripheral end of the cup-shaped filter element sheet is fixed to the core member 2510. The suction filter 2051 can be, therefore, manufactured in a shortened time. In addition, since the mountain fold portions 2511c and 2511f as well as the valley fold portions 2511d and 2511g are alternately arranged in the tubular portions 2511a and the bottom portions 2511b, which are formed along the first and second ribs 2512g and 2512h, the surface are of the suction filter can be sufficiently increased. According to the above features, not only the productivity can be increased, but the life duration of the filter element sheet as well as the pump performance can be improved.

Fourth Embodiment

Figure 23:
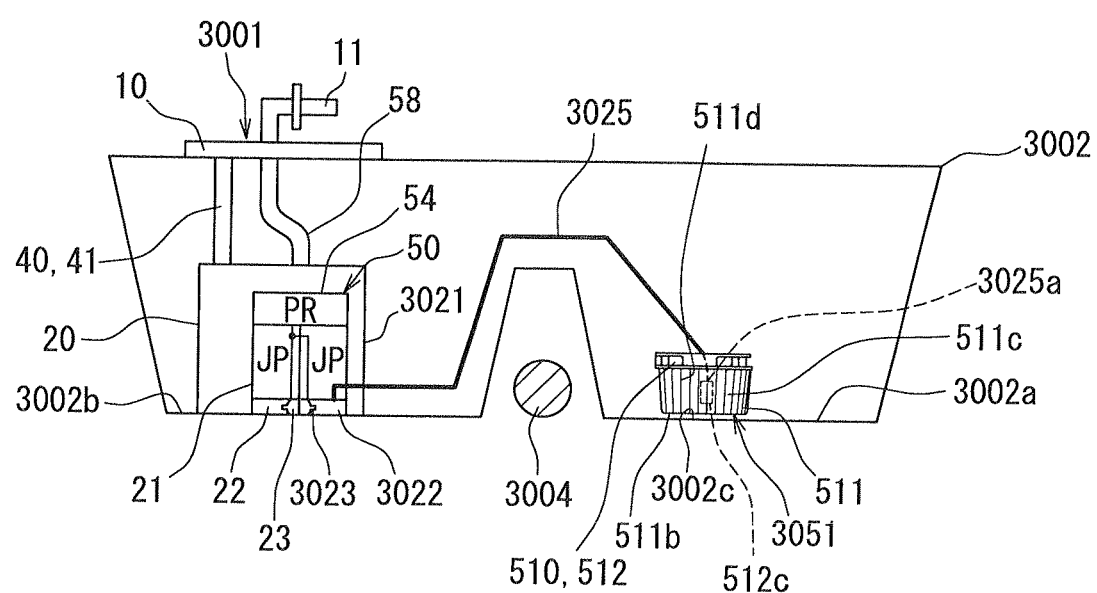
FIG. 23 is a schematic view for explaining a structure of the fuel supply apparatus according to a fourth embodiment of the present disclosure.

A fourth embodiment of the present disclosure is a modification of the first embodiment. As shown in FIG. 23, a fuel tank 3002 of the vehicle is a saddle type having a first and a second tank portion 3002a and 3002b, which are arranged at both sides of a drive shaft 3004 of the vehicle. A fuel supply apparatus 3001 is arranged in the first and second tank portions 3002a and 3002b so as to over-stride a saddle portion (an intermediate portion of the fuel tank 3002 above the drive shaft 3004). A jet pump 3021, which has additional components to the jet pump 21 of the first embodiment, is arranged in the fuel tank 3002. A suction filter 3051, which is substantially the same to the suction filter 51 of the first embodiment, is provided in the first tank portion 3002a, wherein the bottom wall portion 511b of the filter element sheet 511 faces to an inner bottom surface 3002c of the first tank portion 3002a.

The jet pump 3021 has a fuel transfer pipe 3025, a fuel inlet passage 3022 and a jet nozzle 3023. The fuel transfer pipe 3025 is arranged in the first and second tank portions 3002a and 3002b so as to over-stride the intermediate portion of the fuel tank 3002. One end of the fuel transfer pipe 3025 is connected to the suction filter 3051 in the first tank portion 3002a. More exactly, the above one end of the fuel transfer pipe 3025 forms a suction port 3025a for the jet pump 3021 and such suction port 3025a is inserted into the through-hole 512c formed in the cap element 512 of the core member 510. The other end of the fuel transfer pipe 3025 is connected to the fuel inlet passage 3022 in the second tank portion 3002b, wherein the fuel inlet passage 3022 is communicated to the inside of the sub tank 20. The jet nozzle 3023 injects fuel, which is a portion of the fuel discharged from the pressure regulator 54 and separated from the fuel to be supplied to the jet pump 21, into the fuel inlet passage 3022. Negative pressure is generated in the fuel inlet passage 3022 in accordance with the fuel injection from the jet nozzle 3023, so that the fuel in the first tank portion 3002a is sucked into the fuel inlet passage 3022 so as to transfer the fuel into the sub tank 20.

According to the present embodiment, the filter element sheet 511 of the suction filter 3051 is formed in the cup shape having a large surface area, as in the same manner to the first embodiment. A pressure loss is properly controlled when the fuel in the fuel tank 3002 is sucked into the suction port 3025a in accordance with the fuel injection into the fuel inlet passage 3022. A performance decrement of the jet pump 3021, which may be caused by possible vapor generation, can be avoided, and/or shortened service life of the filter element sheet 511 to be caused by clogging can be also avoided.

In addition, as in the same manner to the first embodiment, the performance decrement of the jet pump 3021 can be avoided by the fuel hole 512d (not shown in FIG. 23), and a further improvement for the performance of the jet pump 3021 can be achieved by the mountain fold portions 511c and valley fold portions 511d which are alternately formed in the circumferential direction.

Other Embodiments

The present disclosure should not be limited to the above embodiments but may be modified in various manners without departing from a spirit of the disclosure.

For example, the side wall portions 511a and/or 2511a of the filter element sheets 511 and/or 2511 may be formed by a simple cylindrical surface or a tapered surface having no mountain fold portions and valley fold portions.

In the first, second and fourth embodiments, it is not always necessary to form the fuel hole 512d and the aperture 511h in the core member 510 and the filter element sheet 511. Such fuel hole and aperture may be eliminated, as in the same manner to the third embodiment.

The suction filter 1051 of the second embodiment or the suction filter 2051 of the third embodiment may be applied to the fourth embodiment instead of the suction filter 3051.

What is claimed is:

1. A suction filter for a fuel supply apparatus, which is provided in a fuel tank for supplying fuel from the fuel tank to an outside of the fuel tank, wherein the suction filter filters out extraneous material from the fuel to be sucked into a suction port of a fuel pump from the fuel tank, and wherein the suction filter comprises:
   a core member for forming a fuel passage therein connected to the suction port so that the fuel is supplied from the fuel passage into the suction port; and
   a filter element sheet for covering the core member and formed in a cup shape, a bottom wall portion of which faces to an inner bottom surface of the fuel tank, wherein the filter element sheet filters out the extraneous material from the fuel flowing from the fuel tank into the fuel passage, wherein
   the core member comprises:
   a through-hole formed in a bottom wall portion of the core member, wherein the suction port is inserted into the through-hole so that the suction port is communicated to the fuel passage; and
   a fuel hole formed in the bottom wall portion at a position adjacent to the suction port so as to pass through the bottom wall portion, so that a space formed in the bottom wall portion is communicated to an outside of the filter element sheet.

2. The suction filter according to the claim 1, wherein the core member has multiple ribs respectively spaced from a neighboring rib in a circumferential direction, so that the suction port is surrounded by the ribs, and the filter element sheet is bent along the respective ribs so as to form multiple mountain fold portions and to form multiple valley fold portions between the neighboring ribs.

3. The suction filter according to the claim 1, wherein
   the core member has multiple first ribs respectively spaced from a neighboring first rib in a circumferential direction,
   the core member further has multiple second ribs, each of which is formed between the first ribs in the circumferential direction and extends toward the bottom wall portions of the cup-shaped filter element sheet,
   the cup-shaped filter element sheet has tubular portions and the bottom wall portions,
   the tubular portions are composed of; multiple first mountain fold portions at which the filter element sheet is folded along the first ribs; and multiple first valley fold portions at which the filter element sheet is folded between the neighboring first ribs, and
   the bottom wall portions are composed of; multiple second mountain fold portions at which the filter element sheet is folded along the second ribs; and multiple second valley fold portions at which the filter element sheet is folded between the neighboring second ribs,
   wherein a folding direction of the filter element sheet at the second mountain fold portion is reversed from a folding direction of the filter element sheet at the first valley fold portion, and
   wherein a folding direction of the filter element sheet at the second valley fold portion is reversed from a folding direction of the filter element sheet at the first mountain fold portion.

4. The suction filter according to the claim 1, wherein an upper peripheral end of the cup-shaped filter element sheet is fixed to the core member by welding or adhesive bonding.

5. The suction filter according to the claim 1, further comprising:
   a ring member for holding the filter element sheet from an outside of the cup-shaped filter element sheet,
   wherein an upper peripheral end of the cup-shaped filter element sheet is interposed between the core member and the ring member so that the upper peripheral end thereof is compressed between them and fixed to the core member.

6. The suction filter according to the claim 1, wherein the filter element sheet is composed of;
   a collecting sheet for collecting the extraneous material contained in the fuel, which flows from the fuel tank into the fuel passage; and
   a cover sheet made of a more coarse texture than that for the collecting sheet.

7. The suction filter according to the claim 1, wherein the core member is connected to the suction port of the fuel pump, wherein the fuel is sucked into the suction port in accordance with rotation of an electric motor provided in the fuel pump.

8. A fuel supply apparatus comprising:
   a pump unit provided in a sub tank of a fuel tank for supplying fuel from the sub tank to an outside of the fuel tank, wherein the pump unit has a jet pump for injecting fuel from a pressure regulator into a fuel inlet passage;
   a suction filter provided in the fuel tank for filtering out extraneous material contained in the fuel passing through the suction filter; and
   a fuel transfer pipe connected at its one end to the fuel inlet passage and at its other end to the suction filter so that the fuel is transferred to the fuel inlet passage in accordance with fuel injection from the jet pump, wherein the suction filter comprises:

a core member for forming a fuel passage connected to a suction port formed at the other end of the fuel transfer pipe so that the fuel is supplied from the fuel passage into the suction port; and a filter element sheet for covering the core member and formed in a cup shape, a bottom wall portion of which faces to an inner bottom surface of the fuel tank, wherein the filter element sheet filters out the extraneous material from the fuel flowing from the fuel tank into the suction port, wherein the core member comprises:

a through-hole formed in a bottom wall portion of the core member, wherein the suction port is inserted into the through-hole so that the suction port is communicated to the fuel passage; and a fuel hole formed in the bottom wall portion at a position adjacent to the suction port so as to pass through the bottom wall portion, so that a space formed in the bottom wall portion is communicated to an outside of the filter element sheet.

9. A method for manufacturing a suction filter for a fuel supply apparatus, which is provided in a fuel tank for supplying fuel from the fuel tank to an outside of the fuel tank, wherein the suction filter filters out extraneous material from the fuel to be sucked into a suction port of a fuel pump from the fuel tank, and wherein the suction filter comprises:

a core member for forming a fuel passage therein connected to the suction port so that the fuel is supplied from the fuel passage into the suction port; and a filter element sheet for covering the core member and formed in a cup shape, a bottom wall portion of which faces to an inner bottom surface of the fuel tank, wherein the filter element sheet filters out the extraneous material from the fuel flowing from the fuel tank into the fuel passage, wherein the core member comprises:

a through-hole formed in a bottom wall portion of the core member, wherein the suction port is inserted into the through-hole so that the suction port is communicated to the fuel passage; and a fuel hole formed in the bottom wall portion at a position adjacent to the suction port so as to pass through the bottom wall portion, so that a space formed in the bottom wall portion is communicated to an outside of the filter element sheet wherein the core member has multiple ribs respectively spaced from a neighboring rib in a circumferential direction, so that the suction port is surrounded by the ribs, and the filter element sheet is bent along the respective ribs so as to form multiple mountain fold portions and to form multiple valley fold portions between the neighboring ribs, the method comprising:

a first step for covering the multiple ribs of the core member, which are arranged at equal intervals in the circumferential direction, with the filter element sheet;

a second step for inserting a ring jig onto an outer periphery of the multiple ribs, so that the filter element sheet is folded along the respective ribs to form the mountain fold portions and to form the valley fold portions between the neighboring ribs;

a third step for fixing an upper peripheral end of the cup-shaped filter element sheet to the core member by welding or adhesive bonding; and a fourth step for taking out the ring jig from the core member.

10. A method for manufacturing a suction filter for for a fuel supply apparatus, which is provided in a fuel tank for supplying fuel from the fuel tank to an outside of the fuel tank, wherein the suction filter filters out extraneous material from the fuel to be sucked into a suction port of a fuel pump from the fuel tank, and wherein the suction filter comprises:

a core member for forming a fuel passage therein connected to the suction port so that the fuel is supplied from the fuel passage into the suction port; and a filter element sheet for covering the core member and formed in a cup shape, a bottom wall portion of which faces to an inner bottom surface of the fuel tank, wherein the filter element sheet filters out the extraneous material from the fuel flowing from the fuel tank into the fuel passage, wherein the core member comprises:

a through-hole formed in a bottom wall portion of the core member, wherein the suction port is inserted into the through-hole so that the suction port is communicated to the fuel passage; and a fuel hole formed in the bottom wall portion at a position adjacent to the suction port so as to pass through the bottom wall portion, so that a space formed in the bottom wall portion is communicated to an outside of the filter element sheet wherein the core member has multiple ribs respectively spaced from a neighboring rib in a circumferential direction, so that the suction port is surrounded by the ribs, and the filter element sheet is bent along the respective ribs so as to form multiple mountain fold portions and to form multiple valley fold portions between the neighboring ribs, the method comprising:

a first step for covering the multiple ribs of the core member, which are arranged at equal intervals in the circumferential direction, with the filter element sheet;

a second step for inserting a ring member onto an outer periphery of the multiple ribs, so that the filter element sheet is folded along the respective ribs to form the mountain fold portions and to form the valley fold portions between the neighboring ribs;

a third step for moving the ring member to an upper end of the core member in order that an upper peripheral end of the cup-shaped filter element sheet is interposed between the core member and the ring member, so that the upper peripheral end of the cup-shaped filter element sheet is firmly fixed to the core member.

* * * * *